US011233921B2

(12) United States Patent
Yamada

(10) Patent No.: US 11,233,921 B2
(45) Date of Patent: Jan. 25, 2022

(54) IMAGE PROCESSING APPARATUS THAT SPECIFIES EDGE PIXEL IN TARGET IMAGE USING SINGLE-COMPONENT IMAGE DATA

(71) Applicant: BROTHER KOGYO KABUSHIKI KAISHA, Aichi (JP)

(72) Inventor: Ryuji Yamada, Ogaki (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 16/668,510

(22) Filed: Oct. 30, 2019

(65) Prior Publication Data

US 2020/0068092 A1 Feb. 27, 2020

Related U.S. Application Data

(63) Continuation of application No. 15/935,223, filed on Mar. 26, 2018, now Pat. No. 10,506,131.

(30) Foreign Application Priority Data

Mar. 28, 2017 (JP) .............................. JP2017-063035

(51) Int. Cl.
*H04N 1/40* (2006.01)
*G06T 5/00* (2006.01)
(Continued)

(52) U.S. Cl.
CPC ......... *H04N 1/40093* (2013.01); *G06T 5/002* (2013.01); *G06T 5/003* (2013.01);
(Continued)

(58) Field of Classification Search
CPC ........... H04N 1/40093; H04N 1/40062; H04N 1/4092; H04N 1/482; H04N 1/00005;
(Continued)

(56) References Cited

U.S. PATENT DOCUMENTS

2002/0001409 A1* 1/2002 Chen ..................... H04N 9/045
382/167
2007/0110300 A1* 5/2007 Chang ................... H04N 1/648
382/162
(Continued)

FOREIGN PATENT DOCUMENTS

JP 2009-282928 A 12/2009
JP 2013-211750 A 10/2013

OTHER PUBLICATIONS

Office Action dated Apr. 25, 2019 from parent U.S. Appl. No. 15/935,223, filed Mar. 26, 2018.
(Continued)

*Primary Examiner* — Miya J Williams
*Assistant Examiner* — Darryl V Dottin
(74) *Attorney, Agent, or Firm* — Scully, Scott, Murphy & Presser, P.C.

(57) ABSTRACT

An image processing apparatus performs: acquiring target image data representing a target image including a plurality of pixels, the target image data including a plurality of sets of component image data representing respective ones of a plurality of component images; smoothing the plurality of component images to generate respective sets of a plurality of sets of smoothed component image data representing respective ones of a plurality of smoothed component images; enhancing an edge in each of the plurality of smoothed component images to generate corresponding one set of a plurality of sets of enhanced component image data; generating single-component image data including one type of component value corresponding to each of the plurality of pixels by using the plurality of sets of enhanced component image data; and specifying a plurality of edge pixels using the single-component image data, the plurality of edge pixels constituting an edge in the target image.

20 Claims, 12 Drawing Sheets

(51) Int. Cl.
*H04N 1/48* (2006.01)
*H04N 1/00* (2006.01)
*H04N 1/409* (2006.01)
*G06F 3/12* (2006.01)

(52) U.S. Cl.
CPC ..... *H04N 1/00005* (2013.01); *H04N 1/40062* (2013.01); *H04N 1/4092* (2013.01); *H04N 1/482* (2013.01); *G06F 3/12* (2013.01); *G06F 3/1204* (2013.01); *G06T 2207/10008* (2013.01); *G06T 2207/20192* (2013.01)

(58) Field of Classification Search
CPC ..................... G06T 5/003; G06T 5/002; G06T 2207/20192; G06T 2207/10008; G06F 3/12; G06F 3/1204
USPC .......................................................... 358/447
See application file for complete search history.

(56) References Cited

U.S. PATENT DOCUMENTS

| | | | |
|---|---|---|---|
| 2007/0273929 A1* | 11/2007 | Hayashi | H04N 1/409 358/3.13 |
| 2011/0085738 A1* | 4/2011 | Kitamura | G06T 5/002 382/199 |
| 2011/0234842 A1* | 9/2011 | Ishiga | H04N 9/045 348/223.1 |
| 2013/0257892 A1 | 10/2013 | Ozawa et al. | |

OTHER PUBLICATIONS

Notice of Allowance dated Aug. 7, 2019 from parent U.S. Appl. No. 15/935,223, filed Mar. 26, 2018.

* cited by examiner

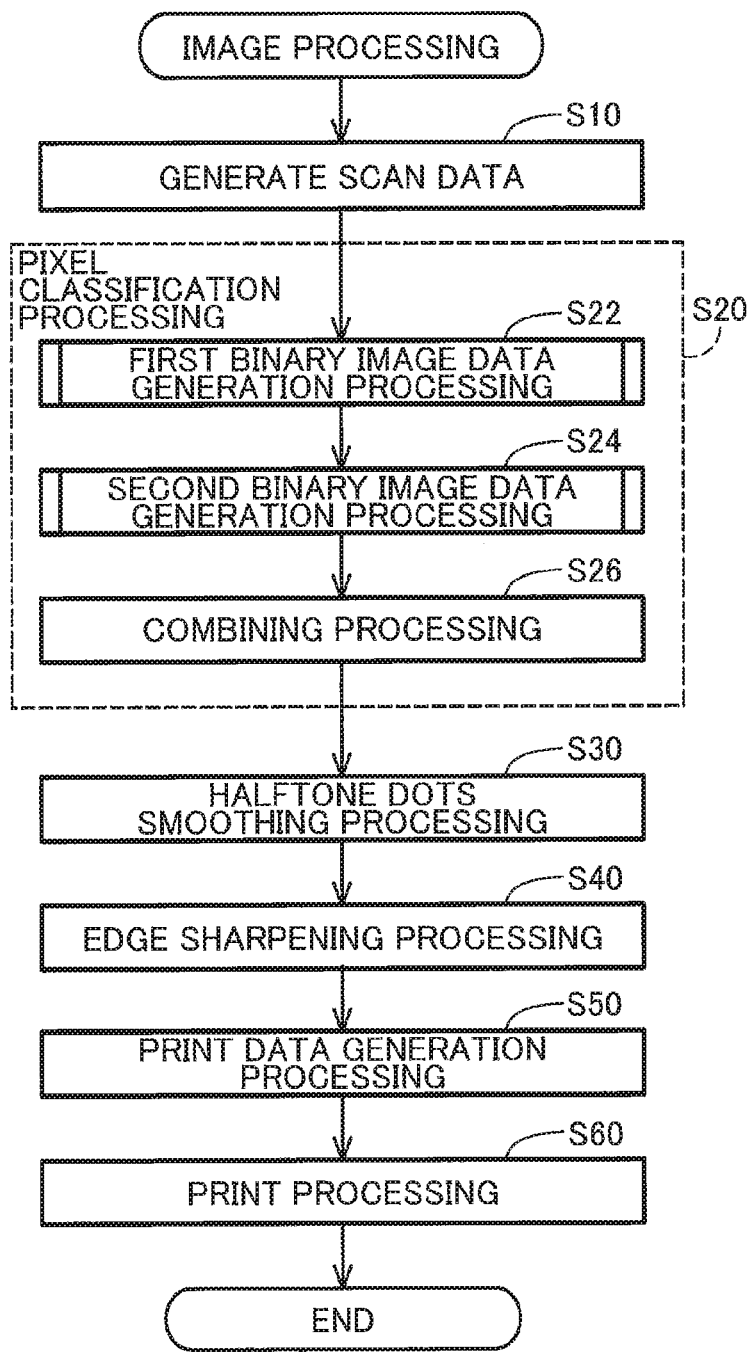

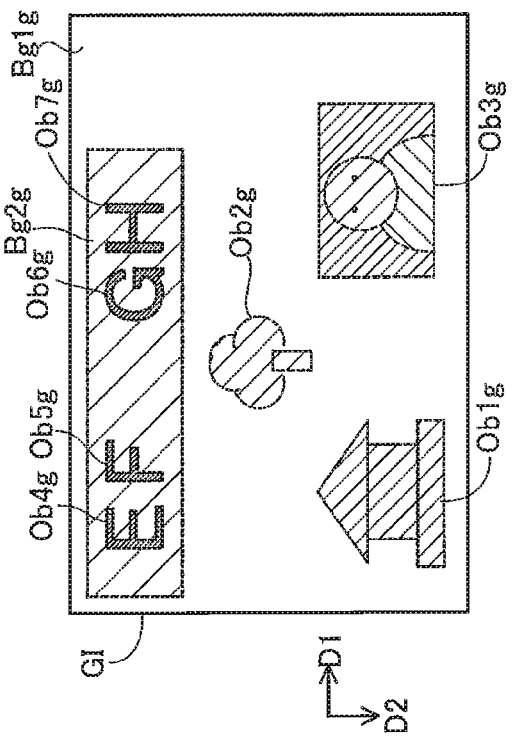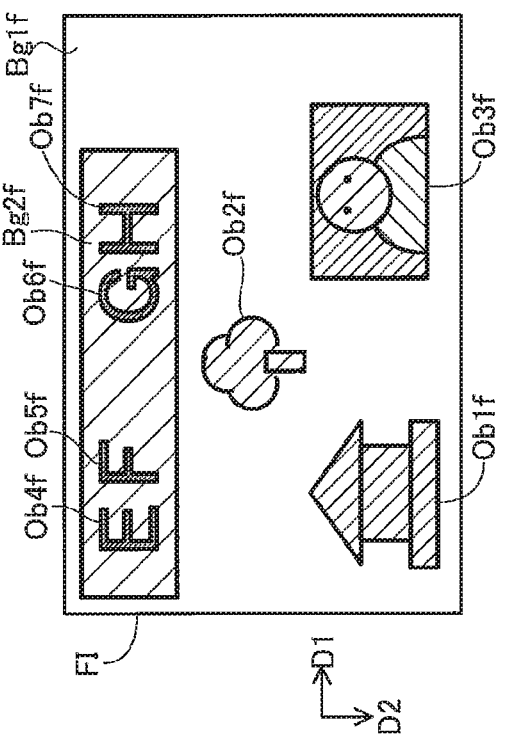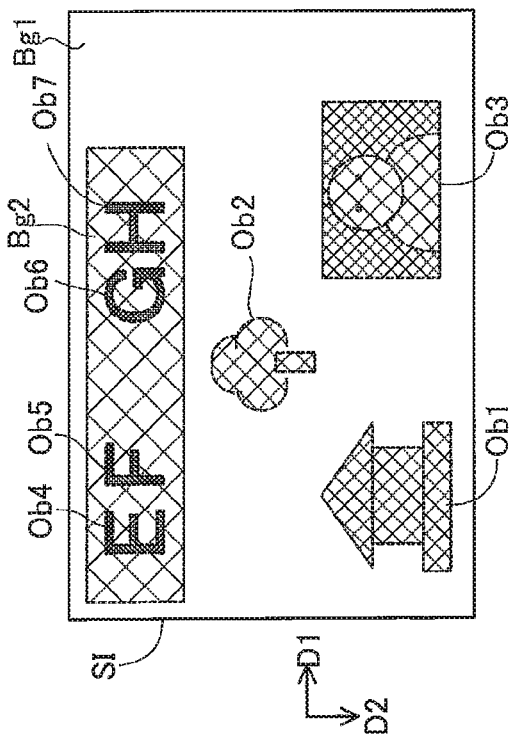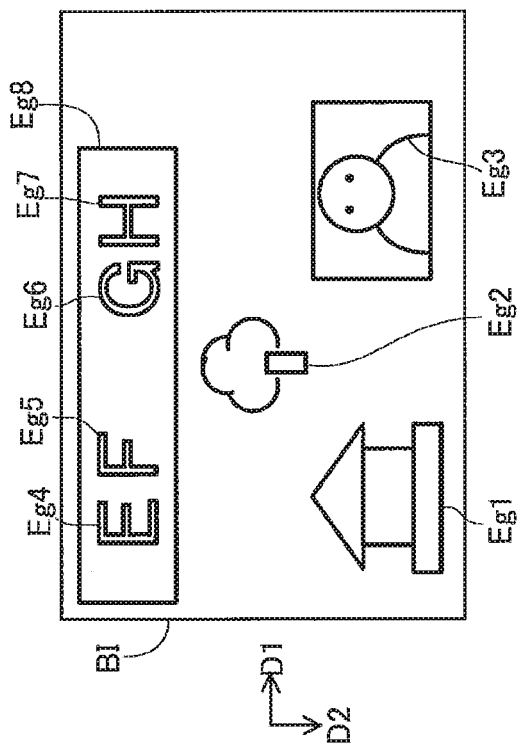

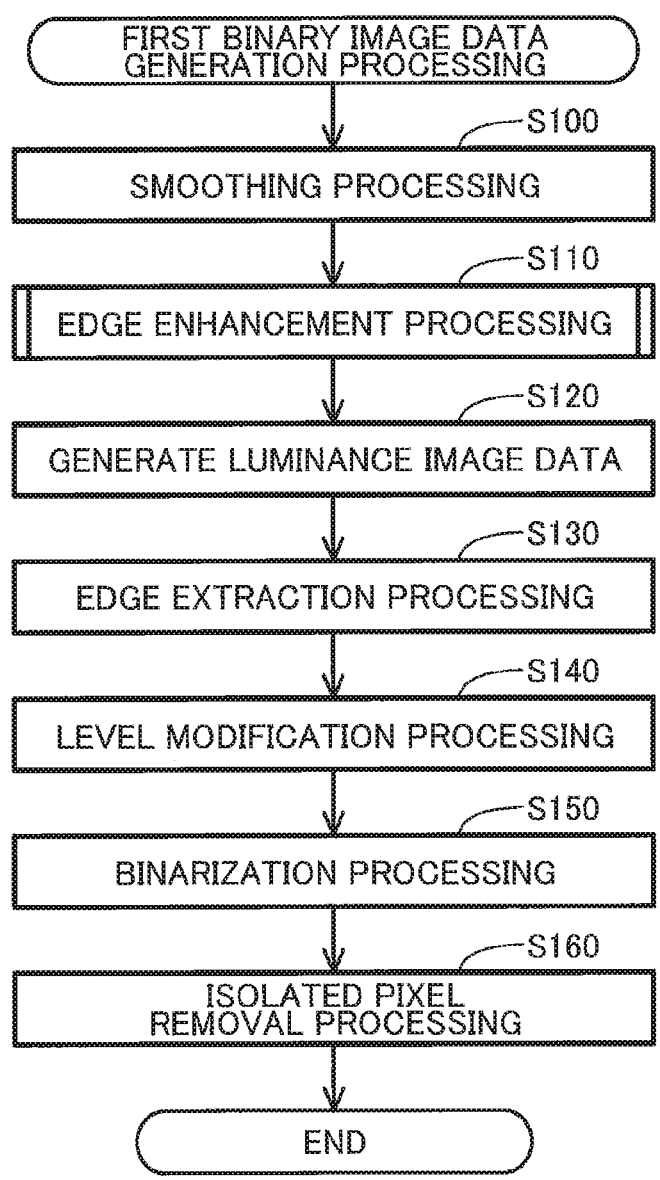

FIG. 5A

| | D1 → | | | | | | |
|---|---|---|---|---|---|---|---|
| D2 ↓ | 1/S | 6/S | 15/S | 20/S | 15/S | 6/S | 1/S |
| | 6/S | 36/S | 90/S | 120/S | 90/S | 36/S | 6/S |
| | 15/S | 90/S | 255/S | 300/S | 255/S | 90/S | 15/S |
| | 20/S | 120/S | 300/S | 400/S | 300/S | 120/S | 20/S |
| | 15/S | 90/S | 255/S | 300/S | 255/S | 90/S | 15/S |
| | 6/S | 36/S | 90/S | 120/S | 90/S | 36/S | 6/S |
| | 1/S | 6/S | 15/S | 20/S | 15/S | 6/S | 1/S |

GFa

| | D1 → | | | | |
|---|---|---|---|---|---|
| D2 ↓ | 1/P | 4/P | 6/P | 4/P | 1/P |
| | 4/P | 16/P | 24/P | 16/P | 4/P |
| | 6/P | 24/P | 36/P | 24/P | 6/P |
| | 4/P | 16/P | 24/P | 16/P | 4/P |
| | 1/P | 4/P | 6/P | 4/P | 1/P |

GFb

TP    P=256

IMAGE PROCESSING APPARATUS THAT SPECIFIES EDGE PIXEL IN TARGET IMAGE USING SINGLE-COMPONENT IMAGE DATA

CROSS REFERENCE TO RELATED APPLICATION

This application is a continuation application of U.S. Ser. No. 15/935,223 filed on Mar. 26, 2018 claims priority from Japanese Patent Application No. 2017-063035 filed Mar. 28, 2017. The entire content of the priority application is incorporated herein by reference.

TECHNICAL FIELD

The present disclosure relates to image processing for specifying edge pixels constituting edges in an image represented by image data.

BACKGROUND

Conventionally, there has been known an image processing apparatus that applies a Sobel filter to scan data representing a scan image to generate edge image data representing edges in the scan image. The image processing apparatus uses the edge image data to specify an object area such as characters and drawing in the scan image.

SUMMARY

However, when an original is a printed matter, halftone dots included in the printed matter appear in the scan image. The technique described above does not take into consideration the halftone dots that can appear in the scan image and, thus, in, for example, an area that looks uniform, edge pixels may be detected due to the halftone dots in that area.

In view of the foregoing, it is an object of the disclosure to provide a technique capable of appropriately specifying edge pixels in a target image while suppressing specification of edge pixels caused by halftone dots.

In order to attain the above and other objects, the present disclosure provides an image processing apparatus that includes: a processor; and a memory. The memory stores a set of computer-readable instructions therein. The set of computer-readable instructions, when executed by the processor, causes the image processing apparatus to perform: acquiring target image data representing a target image including a plurality of pixels, the target image data being generated by scanning an original with an image sensor, the target image data including a plurality of sets of component image data representing respective ones of a plurality of component images, the plurality of sets of component image data corresponding to respective ones of a plurality of components constituting a specific color system; smoothing the plurality of component images to generate respective sets of a plurality of sets of smoothed component image data, the plurality of sets of smoothed component image data representing respective ones of a plurality of smoothed component images; enhancing an edge in each of the plurality of smoothed component images to generate corresponding one set of a plurality of sets of enhanced component image data, the plurality of sets of enhanced component image data representing an enhanced image; generating first single-component image data using the plurality of sets of enhanced component image data, the first single-component image data including one type of component value corresponding to each of the plurality of pixels; and specifying a plurality of edge pixels using the first single-component image data, the plurality of edge pixels constituting an edge in the target image.

According to another aspect, the present disclosure provides a non-transitory computer readable storage medium storing a set of program instructions installed on and executed by a computer. The set of program instructions includes: acquiring target image data representing a target image including a plurality of pixels, the target image data being generated by scanning an original with an image sensor, the target image data including a plurality of sets of component image data representing respective ones of a plurality of component images, the plurality of sets of component image data corresponding to respective ones of a plurality of components constituting a specific color system; smoothing the plurality of component images to generate respective sets of a plurality of sets of smoothed component image data, the plurality of sets of smoothed component image data representing respective ones of a plurality of smoothed component images; enhancing an edge in each of the plurality of smoothed component images to generate corresponding one set of a plurality of sets of enhanced component image data, the plurality of sets of enhanced component image data representing an enhanced image; generating first single-component image data using the plurality of sets of enhanced component image data, the first single-component image data including one type of component value corresponding to each of the plurality of pixels; and specifying a plurality of edge pixels using the first single-component image data, the plurality of edge pixels constituting an edge in the target image.

According to still another aspect, the present disclosure provides an image processing method. The image processing method includes: acquiring target image data representing a target image including a plurality of pixels, the target image data being generated by scanning an original with an image sensor, the target image data including a plurality of sets of component image data representing respective ones of a plurality of component images, the plurality of sets of component image data corresponding to respective ones of a plurality of components constituting a specific color system; smoothing the plurality of component images to generate respective sets of a plurality of sets of smoothed component image data, the plurality of sets of smoothed component image data representing respective ones of a plurality of smoothed component images; enhancing an edge in each of the plurality of smoothed component images to generate corresponding one set of a plurality of sets of enhanced component image data, the plurality of sets of enhanced component image data representing an enhanced image; generating first single-component image data using the plurality of sets of enhanced component image data, the first single-component image data including one type of component value corresponding to each of the plurality of pixels; and specifying a plurality of edge pixels using the first single-component image data, the plurality of edge pixels constituting an edge in the target image.

BRIEF DESCRIPTION OF THE DRAWINGS

The particular features and advantages of the disclosure as well as other objects will become apparent from the following description taken in connection with the accompanying drawings, in which:

FIG. 2 is a flowchart illustrating steps in image processing executed by the multifunction peripheral according to the embodiment;

FIGS. 3A to 3D are first views each illustrating an example of an image used in the image processing, in which FIG. 3A illustrates an example of a scan image represented by scan data, FIG. 3B illustrates an example of a binary image represented by binary image data (classification data), FIG. 3C illustrates an example of a smoothed image represented by smoothed image data, and FIG. 3D illustrates an example of a processed image represented by processed image data;

FIG. 4 is a flowchart illustrating steps in first binary image data generation processing executed by the multifunction peripheral according to the embodiment;

FIGS. 5A and 5B are views each illustrating an example of a smoothing filter, in which a symbol S indicates a denominator of each coefficient in the smoothing filter illustrated in FIG. 5A, and a symbol P indicates a denominator of each coefficient in the smoothing filter illustrated in FIG. 5B;

FIGS. 12A to 12C are second views respectively illustrating examples of images used in the image processing and a comparative example, in which FIG. 12A illustrates an enlarged view of an area including halftone dots which is extracted from the scan image represented by the scan data, FIG. 12B illustrates an enlarged view of the area including the halftone dots which is extracted from a minimum component image represented by minimum component data, and FIG. 12C illustrates an enlarged view of the area including the halftone dots which is extracted from a luminance image represented by luminance image data as the comparative example.

DETAILED DESCRIPTION

A. Embodiment

A-1: Configuration of Multifunction Peripheral 200

Figure 1:
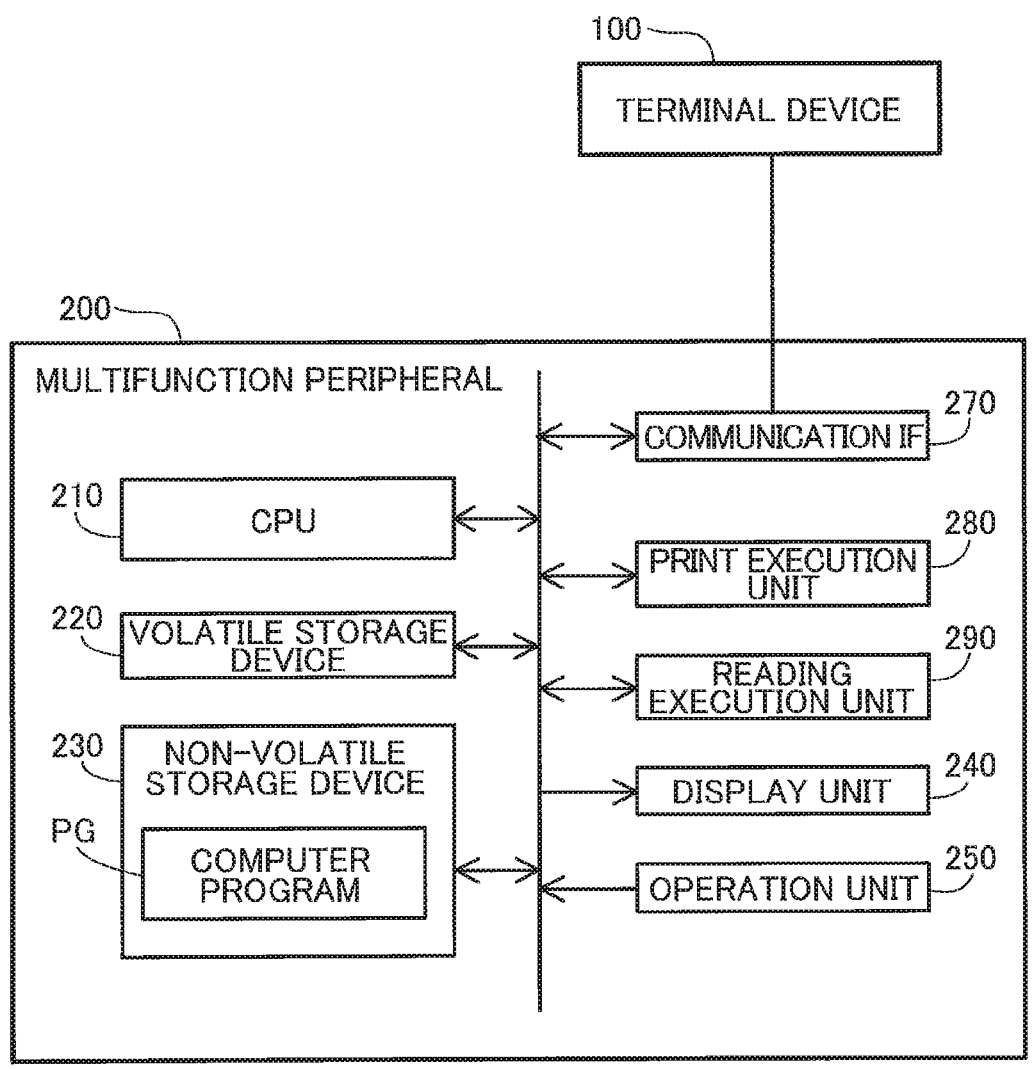
FIG. 1 is a block diagram illustrating a configuration of a multifunction peripheral according to an embodiment of the present disclosure.

An image processing apparatus according to an embodiment will be described while referring to the accompanying drawings wherein like parts and components are designated by the same reference numerals to avoid duplicating description. FIG. 1 is a block diagram illustrating the configuration of a multifunction peripheral as an example of the image processing apparatus. The multifunction peripheral 200 includes a central processing unit (CPU) 210 which is a processor for controlling the multifunction peripheral 200, a volatile storage device 220 such as a dynamic random access memory (DRAM), a non-volatile storage device 230 such as a flash memory, a hard disk drive, or the like, a display unit 240 including a liquid crystal display and the like, an operation unit 250 including a touch panel and buttons superimposed on the liquid crystal display, an interface (communication IF) 270 for communicating with an external device such as a user terminal device 100, a print execution unit 280, and a reading execution unit 290.

The reading execution unit 290 optically reads an original using a linear image sensor according to the control of the CPU 210 to thereby generate scan data. The print execution unit 280 prints an image onto a print medium such as a paper sheet with a laser according to the control of the CPU 210 by using a plurality of types of toner, specifically toner in the colors cyan (C), magenta (M), yellow (Y), and black (K), as coloring materials. More specifically, the print execution unit 280 exposes a photosensitive drum to form an electrostatic latent image and then makes the toner adhere to the electrostatic latent image to thereby form a toner image. The print execution unit 280 transfers the toner image formed on the photosensitive drum onto the paper sheet. As a modification, the print execution unit 280 may be a print execution unit of an inkjet system that ejects ink as a coloring material to form an image onto the paper sheet.

The volatile storage device 220 provides a buffer area for temporarily storing various intermediate data generated when the CPU 210 performs processing. The non-volatile storage device 230 stores a computer program PG therein. The computer program PG is a control program allowing the CPU 210 to perform control of the multifunction peripheral 200. In the present embodiment, the computer program PG is previously stored in the non-volatile storage device 230 at the time of manufacturing the multifunction peripheral 200. Alternatively, the computer program PG may be provided by being downloaded from a server or by being stored in a DVD-ROM, and the like. The CPU 210 executes the computer program PG to thereby execute image processing to be described later.

A-2: Image Processing

FIG. 2 is a flowchart illustrating steps in image processing. The image processing is executed when, for example, a user places an original on a platen of the reading execution unit 290 and the operation is made on the operation unit 250 to input a copy execution instruction. The image processing is processing that acquires scan data generated by the reading execution unit 290 reading the original and, from the scan data, generates print data representing the original to thereby copy the original.

In S10, the CPU 210 reads the original placed on the platen by the user using the reading execution unit 290 to generate scan data as target image data. The original is a printed matter on which an image is printed by, for example, the multifunction peripheral 200 or an unillustrated printer. The generated scan data is stored in the buffer area of the volatile storage device 220 (FIG. 1). Thus, the CPU 210 acquires the scan data of the original as the target image data. The scan data includes a plurality of pixel values, and each pixel value represents the color of the pixel by a color value of an RGB color system (hereinafter, referred to also as "RGB value"). That is, the scan data is RGB image data. The RGB value of one pixel includes three color component values of, for example, red (R), green (G), and blue (B) (hereinafter, referred to also as "R value", "G value", and "B value"). In the present embodiment, the number of gradations of each component value is 256.

It can be said that the scan data which is the RGB image data includes three sets of component image data (R component image data, G component image data, and B component image data) respectively corresponding to three color components constituting the RGB color system. Each set of component image data is image data in which each pixel value is represented by one color component value.

FIGS. 3A to 3D are first views each illustrating an example of an image used in the image processing. FIG. 3A illustrates an example of a scan image SI represented by the scan data. The scan image SI is made up of a plurality of pixels arranged in a matrix form in which the pixels are arranged in rows (first direction D1) and columns (second direction D2). The second direction D2 is orthogonal to the first direction D1.

The scan image SI illustrated in FIG. 3A includes a white background Bg1 representing the base color of the paper sheet of the original, three objects Ob1 to Ob3 different from characters (referred to also as "non-character objects Ob1 to Ob3"), four characters Ob4 to Ob7 (referred to also as "character objects Ob4 to Ob7"), and a background Bg2 of the four character objects Ob4 to Ob7. Each of the non-character objects is, for example, a photograph or a drawing. The background Bg2 is a uniform image having a color different from white.

In S20, the CPU 210 applies pixel classification processing to the scan data. The pixel classification processing is processing that classifies the plurality of pixels constituting the scan image SI into a plurality of edge pixels constituting edges and a plurality of non-edge pixels not constituting the edges.

As a result of the pixel classification processing, binary image data in which the pixel value of the edge pixel and the pixel value of the non-edge pixel (referred to also as "edge pixel value" and "non-edge pixel value") are, for example, "1" and "0", respectively, is generated. FIG. 3B illustrates an example of a binary image BI represented by the binary image data. In the binary image BI, a plurality of edge pixels constituting edges Eg1 to Eg7 of the respective objects Ob1 to Ob7 in the scan image SI and a plurality of edge pixels constituting an edge Eg8 as the boundary between the backgrounds Bg1 and Bg2 in the scan image SI are specified. Thus, the edges mainly include, for example, the edges of characters. The edges further include edges such as thin lines included in the non-character objects (for example, a drawing or a photograph). The binary image data is data representing a result of the pixel classification processing and is thus referred to also as "classification data". Details of the pixel classification processing will be described later.

In S30, the CPU 210 applies halftone dots smoothing processing to the scan data to thereby generate smoothed image data representing a smoothed image. Specifically, the CPU 210 applies smoothing processing to each of the plurality of non-edge pixel values included in the scan data using a smoothing filter such as a Gaussian filter GF to thereby calculate a plurality of non-edge pixel values that has been subjected to the smoothing processing (referred to also as "smoothed non-edge pixel values"). The non-edge pixel values to be subjected to the smoothing processing are specified by referring to the classification data generated in the classification processing of S20. The CPU 210 generates smoothed image data including the plurality of edge pixel values included in the scan data and the plurality of smoothed non-edge pixel values.

FIG. 3C illustrates an example of a smoothed image GI represented by the smoothed image data. The smoothed image GI includes a white background Bg1g, objects Ob1g to Ob7g and a background Bg2g obtained by smoothing the objects Ob1 to Ob7 and background Bg2 in the scan image SI. Portions (non-edge portions) of the objects Ob1g to Ob7g and background Bg2g other than the edges thereof (referred to also as "non-edge portions") are smoother than those of the objects Ob1 to Ob7 and background Bg2 in the scan image SI illustrated in FIG. 3A.

In S40, the CPU 210 applies edge sharpening processing to the smoothed image data to thereby generate processed image data. Specifically, the CPU 210 applies sharpening processing to each of the plurality of edge pixel values included in the smoothed image data using, for example, unsharp mask processing or sharpening filter application processing to calculate a plurality of edge pixel values that has been subjected to the sharpening processing (referred to also as "sharpened edge pixel values"). The edge pixel values to be subjected to the sharpening processing are specified by referring to the classification data generated in the classification processing of S20. The CPU 210 generates processed image data including the plurality of non-edge pixel values included in the smoothed image data (the plurality of smoothed non-edge pixel values) and the plurality of sharpened edge pixel values. The plurality of edge pixel values included in the smoothed image data has not been subjected to the smoothing processing and is thus the same as the plurality of edge pixel values included in the scan data. Therefore, it can be also said that the edge sharpening processing in this step is applied to the plurality of edge pixel values included in the scan data.

FIG. 3D illustrates an example of a processed image H represented by the processed image data. The processed image FI includes a white background Bg1f, and objects Ob1f to Ob7f and a background Bg2f respectively corresponding to the objects Ob1 to Ob7 and background Bg2 in the scan image SI. The edges of the objects Ob1f to Ob7f and background Bg2f in the processed image FI are sharper than those of the objects Ob1 to Ob7 and background Bg2 in the scan image SI illustrated in FIG. 3A, and those of the objects Ob1g to Ob7g and background Bg2g in the smoothed image GI illustrated in FIG. 3C.

As can be seen from the above description, the objects Ob1f to Ob7f and background Bg2f in the processed image FI include the sharpened edges and smoothed non-edge portions.

In S50, the CPU 210 executes print data generation processing to generate print data using the processed image data. Specifically, the CPU 210 applies color conversion processing to the processed image data which is RGB image data to thereby generate CMYK image data representing the color of each pixel by a CMYK value which is a color value having color components (components of C, M, Y, and K) corresponding to color materials used in printing. The color conversion processing is executed by referring to, for example, a known look-up table. The CPU 210 applies halftone processing to the CMYK image data to thereby generate dot data indicating a dot formation state for each color material to be used in printing and for each pixel. The dot formation state may include, for example, two states of "dot" and "no dot" or four states of "large dot", "medium dot", "small dot", and "no dot". The halftone processing is executed according to, for example, a dither method or an error diffusion method. The CPU 210 rearranges the dot data in an order to be used in printing and adds a printing command to the rearranged dot data to thereby generate print data.

In S60, the CPU 210 executes the print processing and ends the image processing. Specifically, the CPU 210 supplies the print data to the print execution unit 280 to make the print execution unit 280 print the processed image.

According to the image processing described above, first image processing (specifically, the edge sharpening processing) is applied to the plurality of edge pixel values that has been specified in the scan data (S40), and second image processing (specifically, the halftone dots smoothing processing) different from the first image processing is applied to the plurality of non-edge pixel values that has been specified in the scan data (S30), whereby the processed image data is generated. Thus, a plurality of types of image processing which is mutually different is applied to the pixel values of the edge pixels (edge pixel value) and the pixel values of the pixels different from the edge pixels (non-edge pixel values), respectively, so that the image processing is appropriately applied to the scan data. As a modification, the edge sharpening processing of S40 may be executed prior to the halftone dots smoothing processing of S30.

More specifically, the processed image data including the plurality of sharpened edge pixel values and the plurality of smoothed non-edge pixel values is generated (S30, S40). As a result, the processed image data representing a good-looking processed image FI can be generated.

For example, in the processed image data, values that have been subjected to the sharpening processing are respectively used for the edge pixel values constituting the edges of the objects and the like, as illustrated in the processed image FI of FIG. 3D. As a result, the edges in the processed image FI look sharp, so that the processed image FI to be printed can be improved in appearance, for example.

Further, in the processed image data, pixel values that have been subjected to the smoothing processing (i.e., smoothed pixel values) are respectively used for the pixel values of the non-edge pixels constituting a uniform portion such as the background Bg2 in the processed image FI or a non-edge portion of the object. As a result, for example, halftone dots that my cause moire can be suppressed from appearing at the non-edge portions in the processed image FI, which can suppress problems such as moire from occurring in the processed image H to be printed. Accordingly, the processed image H to be printed can be improved in appearance.

For example, the original used in generating the scan data is a printed matter on which an image is printed. Thus, at the level of dots constituting an image, halftone dots are formed in a uniform portion, such as the background Bg2, having a color different from white in the original. The halftone dots include a plurality of dots and a portion having no dot (portion representing the base color of the original). Therefore, at the pixel level, the halftone dots are formed in an area representing the background Bg2 in the scan image SI. The dots in the halftone dots are arranged with periodicity due to influence of a dither matrix and the like used in printing the original. Therefore, when printing is performed using the scan data, moire is likely to appear due to interference between the periodic component of the dot pattern in the halftone dots existing in the original image (scan image SI) before the halftone processing and the periodic component of the dot pattern in the halftone dots constituting a printing image. In the processed image H of the present embodiment, the periodic component of the dot pattern constituting a portion other than the edges in the original image (scan image SI) is reduced by the smoothing processing. As a result, when the processed image H is printed using the processed image data, problems such as moire can be suppressed from occurring in the processed image FI to be printed.

Particularly, in the image processing described above, print data is generated using the processed image data (S50). Accordingly, for example, appropriate print data capable of suppressing moire which is likely to occur in the processed image FI to be printed can be generated.

A-3: Pixel Classification Processing

The pixel classification processing executed in S20 of FIG. 2 will be described. In S22, the CPU 210 executes first binary image data generation processing using the target image data to thereby generate first binary image data. The first binary image data is binary data defining the edge pixels and non-edge pixels. Each edge pixel defined by the first binary image data is referred to as a "first edge pixel", and each non-edge pixel defined by the first binary image data is referred to as a "first non-edge pixel". The first binary image data generation processing will be described later in detail.

In S24, the CPU 210 executes second binary image data generation processing using the target image data to thereby generate second binary image data. As with the first binary image data, the second binary image data is binary data defining the edge pixels and non-edge pixels. The second binary image data is generated by processing different from processing by which the first binary image data is generated, and is different from the first binary image data. Each edge pixel defined by the second binary image data is referred to as a "second edge pixel", and each non-edge pixel defined by the second binary image data is referred to as a "second non-edge pixel". The second binary image data generation processing will be described later in detail.

In S26, the CPU 210 executes combining processing to combine the first binary image data generated in S22 and second binary image data generated in S24 to thereby generate binary image data (classification data) defining finally specified edge pixels and non-edge pixels. Specifically, the CPU 210 takes the logical sum of the pixel values of the first binary image data and those of the second binary image data to thereby generate the binary image data as the classification data. In other words, the CPU 210 finally specifies, as the plurality of edge pixels, a pixel group including the plurality of first edge pixels specified using the first binary image data and the plurality of second edge pixels specified using the second binary image data and not including pixels different from both the first and second edge pixels. As a result, omission in specification of the edge pixels in the scan image SI can be effectively reduced.

A-4: First Binary Image Data Generation Processing

The first binary image data generation processing executed in S22 of FIG. 2 will be described. FIG. 4 is a flowchart illustrating steps in the first binary image data generation processing. In S100, the CPU 210 applies smoothing processing to three sets of component image data included in the target image data, that is, R component image data, G component image data, and B component image data. As a result, three sets of smoothed component image data, that is, smoothed R component image data, smoothed G component image data, and smoothed B component image data are generated.

The smoothing processing is processing to smooth a component image represented by the component image data to be processed (referred to also as "processing component image data"). In the smoothing processing of the present embodiment, the CPU 210 applies a predetermined smoothing filter to the pixel values constituting the processing component image data to thereby calculate the smoothed pixel values. FIGS. 5A and 5B are views each illustrating an example of the smoothing filter. In the present embodiment, a Gaussian filter GFa illustrated in FIG. 5A is used as the smoothing filter. The Gaussian filter GFa specifies coefficients corresponding to respective ones of forty-nine pixels of seven-by-seven pixels arranged in a matrix form in which the pixels are arranged in rows (horizontal direction) and columns (vertical direction). Note that the horizontal direction and vertical direction correspond to the first direction D1 and second direction D2 illustrated in FIGS. 3A to 3D, respectively. Hereinafter, for the purpose of illustration, the upstream and downstream sides in the first direction D1 will be described as the left and right, respectively, and the upstream and downstream sides in the second direction D2 will be described as the top and bottom, respectively. In other words, the Gaussian filter GFa specifies one coefficient corresponding to a target pixel TP positioned at the center of the filter range and coefficients corresponding to forty-eight peripheral pixels including four pixels adjacent to the left, right, top, and bottom of the target pixel TP. The CPU 210 multiplies the respective pixel values of forty-nine pixels within the filter range including the target pixel TP and its peripheral pixels by their corresponding coefficients specified in the Gaussian filter GF to calculate forty-nine modified values. Then, the CPU 210 calculates the sum of the forty-nine modified values as the smoothed pixel value of the target pixel TP. For example, in the Gaussian filter GFa, the coefficient corresponding to the target pixel is specified as (400/S), where the denominator S is 4096.

In S110, the CPU 210 applies edge enhancement processing to the three sets of smoothed component image data to thereby generate three sets of edge-enhanced component image data, that is, edge-enhanced R component image data, edge-enhanced G component image data, and edge-enhanced B component image data.

Figure 6:
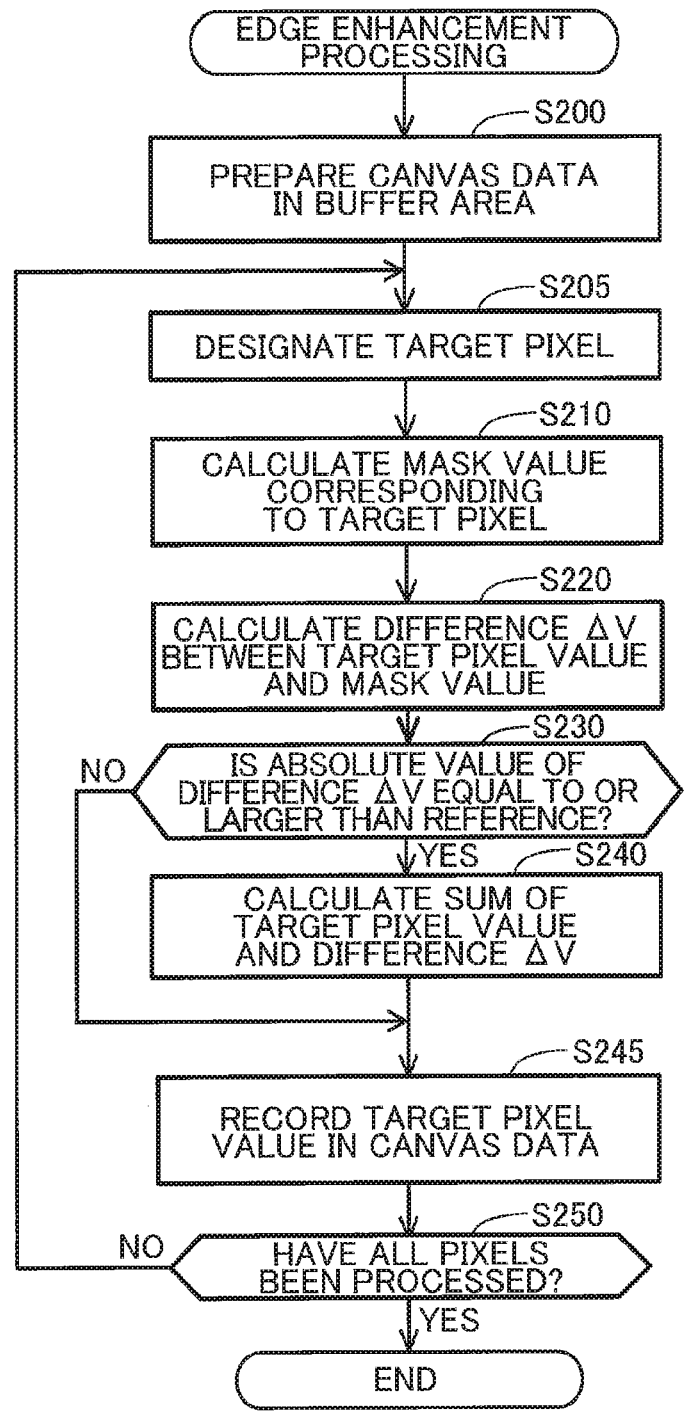
FIG. 6 is a flowchart illustrating steps in edge enhancement processing executed by the multifunction peripheral according to the embodiment.

FIG. 6 is a flowchart illustrating steps in the edge enhancement processing. It is assumed here that the smoothed R component image data is the processing smoothed component image data. The same processing is applied also to the smoothed G component image data and smoothed B component image data.

In S200, the CPU 210 prepares canvas data for generating the edge-enhanced R component image data in a memory (specifically, the buffer area of the volatile storage device 220). A canvas (initial image) represented by the canvas data is an image having the same size as the scan image SI, i.e., an image having the same number of pixels. Each pixel value in the canvas data is set to an initial value (0, for example).

In S205, the CPU 210 designates a target pixel from a plurality of pixels in a smoothed R component image represented by the smoothed R component image data.

In S210, the CPU 210 calculates a mask value MV corresponding to the designated target pixel. The mask value MV is calculated by the processing to smooth a pixel value of the target pixel (referred to also as "target pixel value TV") using the target pixel value TV and the pixel values of a predetermined number of peripheral pixels including four pixels adjacent to the left, right, top, and bottom of the target pixel. Thus, the mask value MV is referred to also as "smoothed value". Specifically, the average value of one-hundred pixel values of ten-by-ten pixels arranged in a matrix form in which the pixels are arranged in rows (first direction D1) and columns (second direction D2) with the target pixel as the center is calculated as the mask value MV corresponding to the target pixel TP.

In S220, the CPU 210 calculates a difference $\Delta V$ between the target pixel value TV and the mask value MV corresponding to the target pixel ($\Delta V=(TV-MV)$).

In S230, the CPU 210 determines whether or not an absolute value of the difference $\Delta V$ is equal to or larger than a reference. Specifically, the CPU 210 determined whether or not the absolute value of the difference $\Delta V$ is equal to or larger than a predetermined threshold value TH. When the component value takes 256 gradation values ranging from 0 to 255, the threshold value TH is, for example, a value of about 20 to 30.

When the absolute value of the difference $\Delta V$ is equal to or larger than the reference (S230: YES), in S240, the CPU 210 calculates the sum (TV+$\Delta V$) of the target pixel value TV and the difference $\Delta V$ corresponding to the target pixel as a processed value. When the absolute value of the difference $\Delta V$ is smaller than the reference (S230: NO), the CPU 210 skips the step S240.

In S245, the CPU 210 records the pixel value of the target pixel TP in the canvas data prepared in S200. When the step S240 is executed, the sum of the target pixel value TV and the difference $\Delta V$ corresponding to the target pixel TP calculated as the processed value in S240 is recoded in the canvas data. On the other hand, when the step S240 is skipped, the target pixel value TV in the smoothed R component image data is recorded in the canvas data as it is.

In S250, the CPU 210 determines whether or not all the pixels in the smoothed R component image have been processed as the target pixel. When there is any unprocessed pixel (S250: NO), the CPU 210 returns to S205 and designates the unprocessed pixel as the target pixel. When all the pixels have been processed (S250: YES), the CPU 210 ends the edge enhancement processing. At this point of time, the edge-enhanced R component image data has been generated.

Figure 7A:
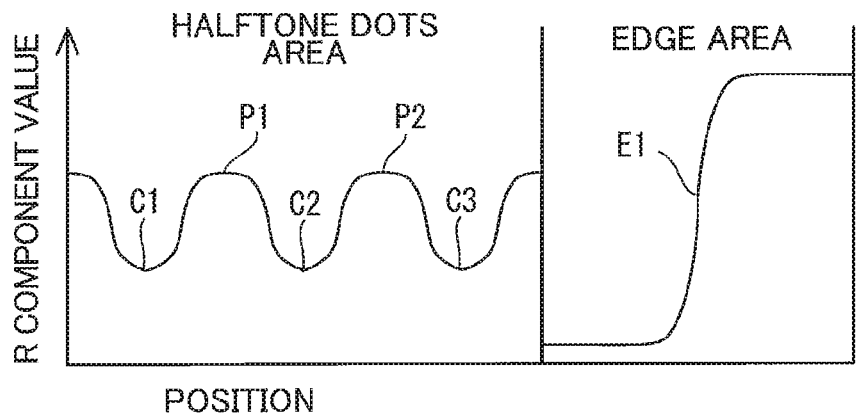
FIG. 7A is an explanatory view conceptually illustrating R component image data before smoothing processing.
Figure 7B:
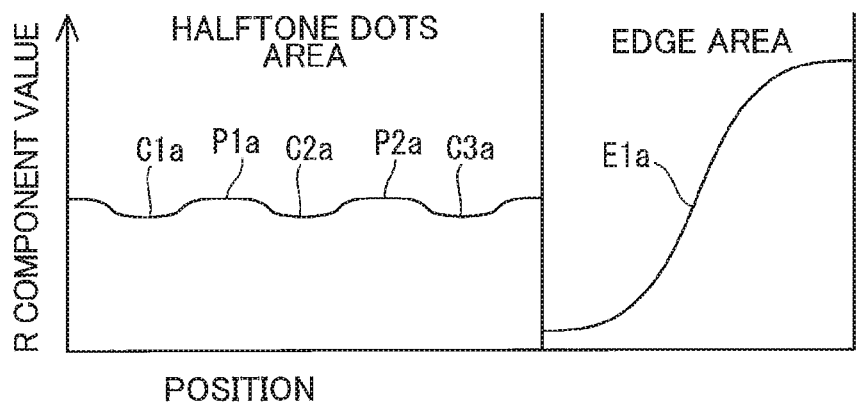
FIG. 7B is an explanatory view conceptually illustrating smoothed R component image data obtained by applying smoothing processing to the R component image data illustrated in FIG. 7A.
Figure 7C:
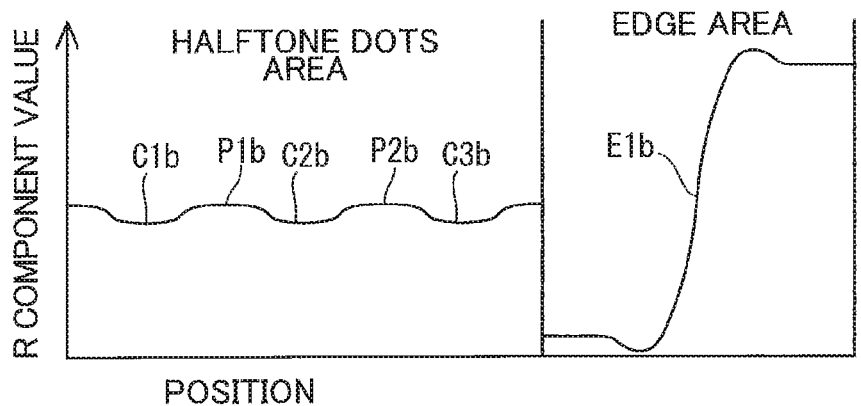
FIG. 7C is an explanatory view conceptually illustrating edge-enhanced R component image data obtained by applying edge enhancement processing to the smoothed R component image data illustrated in FIG. 7B.

FIGS. 7A to 7C are explanatory views of the R component image data, smoothed R component image data, and edge-enhanced R component image data. FIG. 7A shows a graph conceptually illustrating the R component image data before the smoothing processing of S100 in FIG. 4. FIGS. 7B and 7C show graphs conceptually illustrating the smoothed R component image data and edge-enhanced R component image data, respectively. The left side of each of the graphs conceptually illustrates a halftone dots area representing the halftone dots, and the right side thereof conceptually illustrates an edge area representing an edge of an object such as a character. The vertical axis of each graph indicates the R component value, and the horizontal axis indicates the position in a predetermined direction (for example, the first direction D1 illustrated in FIGS. 3A to 3D).

In the R component image data before the smoothing processing, for example, a plurality of valley parts C1 to C3 and a plurality of peak parts P1 and P2 respectively corresponding to a plurality of halftone dots and a plurality of gaps between the halftone dots appear in the halftone dots area (FIG. 7A). If differences in the R component value between the valley parts C1 to C3 and peak parts P1 and P2 remain large, in the binary processing of S150 to be described later, edge pixels representing halftone dots are likely to be specified due to the differences in the R component value. The halftone dots area includes the halftone dots when viewed at the pixel level (when viewed from a microscopic perspective capable of recognizing individual dots constituting the halftone dots area); while it is observed as a uniform area when viewed from an observer's perspective (when viewed from a macroscopic perspective incapable of recognizing individual dots constituting the halftone dots area). Thus, in the present embodiment, the edge pixels due to the halftone dots should not be specified in the halftone dots area. This is because the halftone dots area is preferably smoothed in S30 of FIG. 2 and should not be sharpened in S40 of FIG. 2. If edges of the halftone dots are sharpened, periodicity of the halftone dots becomes noticeable, so that moire is likely to appear when printing is performed using the image. For example, the edge pixel should not be specified in a uniform portion such as the background Bg2 in the scan image SI or a portion different from the edge of the object.

In the smoothed R component image data (FIG. 7B), for example, the differences in the R component value between a plurality of valley parts C1a to C3a and a plurality of peak parts P1a and P2a in the halftone dots area become sufficiently smaller by the smoothing processing than those in the R component image data before the smoothing processing (FIG. 7A).

In the edge enhancement processing of the present embodiment, the larger the difference ΔV between the target pixel value TV and mask value MV corresponding to the target pixel TP is, the larger the effect of the edge enhancement becomes. Thus, in a flat area like the halftone dots area of FIG. 7B where the differences in the R component value are comparatively small, the effect of the edge enhancement becomes small. Further, in the edge enhancement processing of the present embodiment, when the difference ΔV for the target pixel TP is smaller than the reference, the edge enhancement is not executed for the target pixel TP, but the target pixel value TV in the smoothed R component image data is used as it is (S230 of FIG. 6). As a result, in the edge-enhanced R component image data (FIG. 7C), the differences in the R component value between a plurality of valley parts C1b to C3b and a plurality of peak parts P1b and P2b in the halftone dots area are not larger than those in the smoothed R component image data (FIG. 7B) even though the edge enhancement processing has been executed to the smoothed R component image data. That is, in the edge-enhanced R component image data (FIG. 7C), the differences in the R component value between the plurality of valley parts C1b to C3a and plurality of peak parts P1b and P2b become sufficiently smaller than those in the R component image data before the smoothing processing (FIG. 7A), as in the smoothed R component image data (FIG. 7B).

In the R component image data before the smoothing processing, a varying part E1 where the R component value rapidly changes corresponding to the edge appears in, for example, the edge area representing an edge of an object such as a character (FIG. 7A). In the varying part E1, the larger a change in the value is, the more likely the edge pixel representing the edge of the object is specified due to the difference in the R component value in binarization processing of S150 to be described later.

In the smoothed R component image data (FIG. 7B), a change in the value at a varying part E1a becomes smaller (more gradual) in, for example, the edge area than that in the R component image data before the smoothing processing (FIG. 7A).

However, since the change in the value at the varying part E1a corresponding to an edge of an object such as a character is sufficiently larger than the change in the value in the halftone dots area, after the edge enhancement processing is applied, the change in the value at the varying part E1a is returned to the rapid change again. As a result, in the edge-enhanced R component image data (FIG. 7C), the change in the R component value at a varying part E1b becomes larger than that in the smoothed R component image data (FIG. 7B). Thus, in the edge-enhanced R component image data (FIG. 7C), the change in the value at the varying part E1b in the edge area is almost the same as or more rapid than that in the R component image data before the smoothing processing (FIG. 7A).

As can be seen from the above description, in the present embodiment, since the smoothing processing (S100) and edge enhancement processing (S110) are applied to the component image data in this order, it can be suppressed that pixels representing edges of halftone dots are specified as edge pixels and it can be promoted that pixels representing edges of an object such as a character are specified as edge pixels. As a result, the plurality of edge pixels in the scan image SI can be appropriately specified.

After three sets of edge enhanced component image data corresponding to three color components of R, G, and B are generated, in S120 of FIG. 4, the CPU 210 generates luminance image data using the three sets of edge-enhanced component image data. The luminance image data is data representing the luminance of each of the pixels in an edge-enhanced image represented by the three sets of edge-enhanced component image data. Specifically, the CPU 210 uses the R value, G value, and B value of each pixel acquired from the three sets of edge-enhanced component image data to calculate a luminance Y of each pixel. The luminance Y is the weighted average of the three component values and can be calculated using the following expression: Y=0.299×R+0.587×G+0.114×B. The luminance image data is an example of single-component image data including one type of component value (a value representing the luminance).

In S130, the CPU 210 applies edge extraction processing to the generated luminance image data. The edge extraction processing is processing to extract edges in the luminance image represented by the luminance image data. The CPU 210 thereby generates edge strength data. Specifically, the CPU 210 applies a so-called Sobel filter to the pixel values constituting the luminance image data to thereby calculate a plurality of edge strengths Se. The CPU 210 generates the edge strength data in which a plurality of pixel values is respectively represented by the plurality of edge strengths Se.

The following shows a calculation expression (1) of the edge strength. A gradation value P (x, y) in the expression (1) indicates the gradation value of a specific pixel position (x, y) in the luminance image. The position x indicates a pixel position in the first direction D1, and the position y indicates a pixel position in the second direction D2. An edge strength Se (x, y) at the pixel position (x, y) in the luminance image is calculated using nine pixel values of three-by-three pixels in rows and columns centered on the pixel position (x, y). The first and second terms in the calculation expression (1) are each the absolute value of the sum of the values obtained by multiplying the gradation values of the pixels at the nine positions by their corresponding coefficients. The first term is a differential of the gradation value in the first direction D1 (i.e., differential in the horizontal direction), and the second term is a differential of the gradation value in the second direction D2 (i.e., differential in the vertical direction). The calculated edge strength Se (x, y) is normalized to 256 gradation values ranging from 0 to 255.

$$Se(x, y) = \left| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right| + \left| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right| \quad (1)$$

In an edge strength image represented by the generated edge strength data, the pixel values of the pixels at the positions corresponding to the edges in the scan image SI, i.e., the pixel values of the pixels at the positions corresponding to the edges Eg1 to Eg8 in the binary image BI of FIG. 3B are larger than pixel values of pixels at the other positions.

In S140, the CPU 210 applies level modification processing to the edge strength data to thereby generate modified edge strength data. The level modification processing is modification processing to extend a specific range within the range of the gradation values that the pixel values constituting the edge strength data can take (in the present embodiment, values ranging from 0 to 255).

Figure 8:
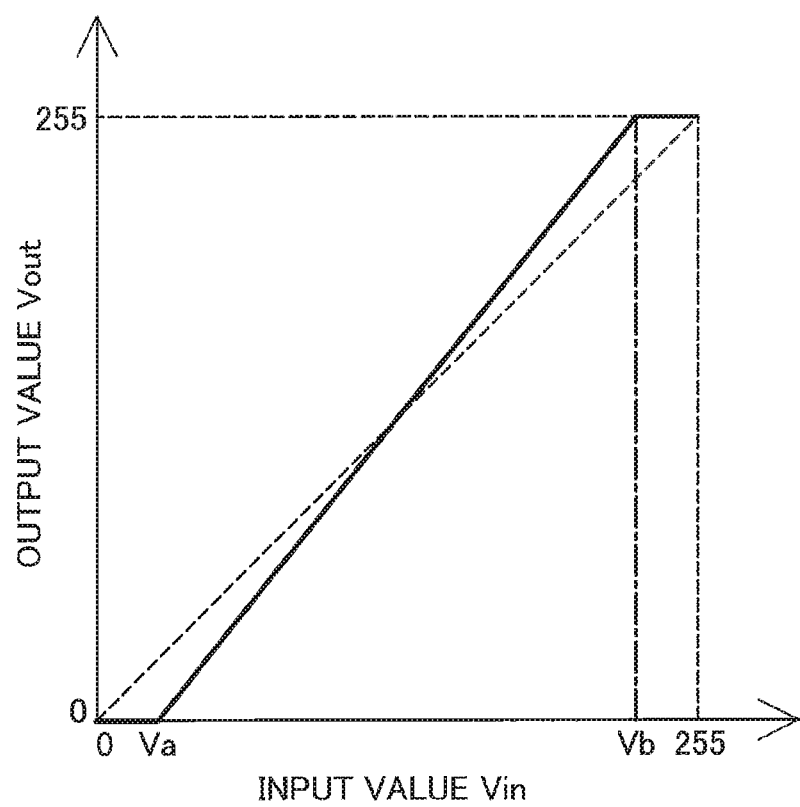
FIG. 8 is a view illustrating an example of a tone curve for use in level modification processing.

FIG. 8 is a view illustrating an example of a tone curve for use in the level modification processing. Specifically, the CPU 210 applies the tone curve illustrated in FIG. 8 to the pixel values constituting the edge strength data. More specifically, each of the pixel values is taken as an input value Vin, and an output value Vout corresponding to the input value Vin on the tone curve is taken as a converted value. As a result, pixel values equal to or greater than a threshold Vb (for example, 245) are all converted into the maximum value (255), and pixel values equal to or smaller than a threshold Va (for example, 10) are all converted into the minimum value (0). Thus, the range of pixel values greater than the threshold Va and smaller than the threshold Vb is extended to the range from 0 to 255.

In S150, the CPU 210 applies binarization processing to the modified edge strength data to thereby generate binary image data. For example, in the modified edge strength data, the CPU 210 classifies pixels having a pixel value (i.e., edge strength) equal to or greater than a threshold (for example, 128) into edge pixels, and classifies pixels having a pixel value smaller than the threshold into non-edge pixels. As described above, in the binary image data, the edge pixel value and non-edge pixel value are "1" and "0", respectively.

In S160, the CPU 210 applies isolated pixel removal processing to the binary image data. The isolated pixel removal processing is processing to remove isolated edge pixels and isolated non-edge pixels from the binary image data. The CPU 210 thereby generates binary image data that has been subjected to the isolated pixel removal processing (referred to also as "removed binary image data").

Figure 9A:
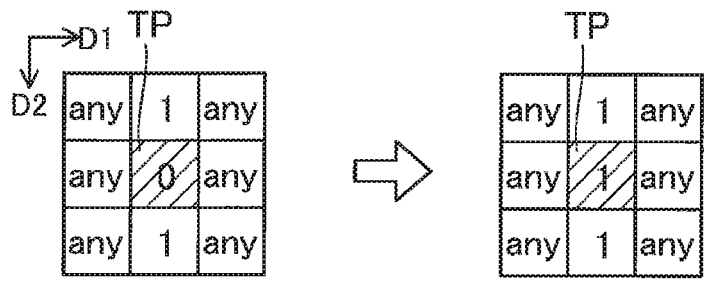
FIGS. 9A to 9D are explanatory views for explaining isolated pixel removal processing.
Figure 9B:
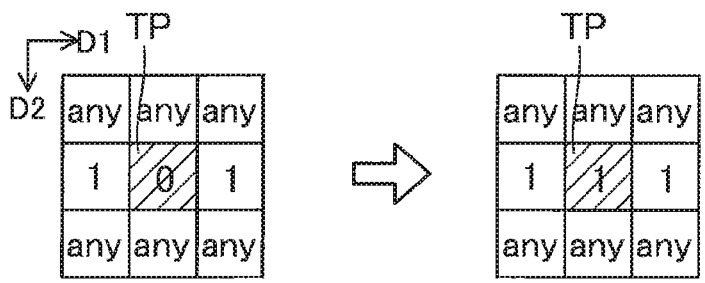
Figure 9C:
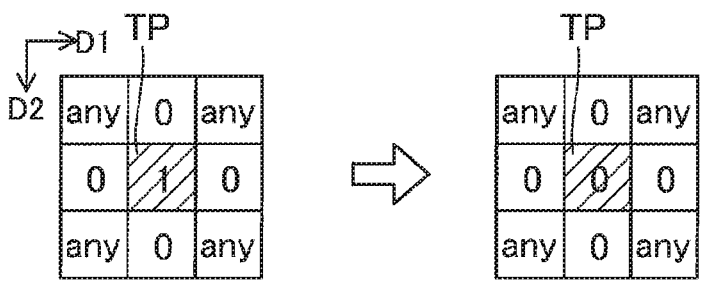
Figure 9D:
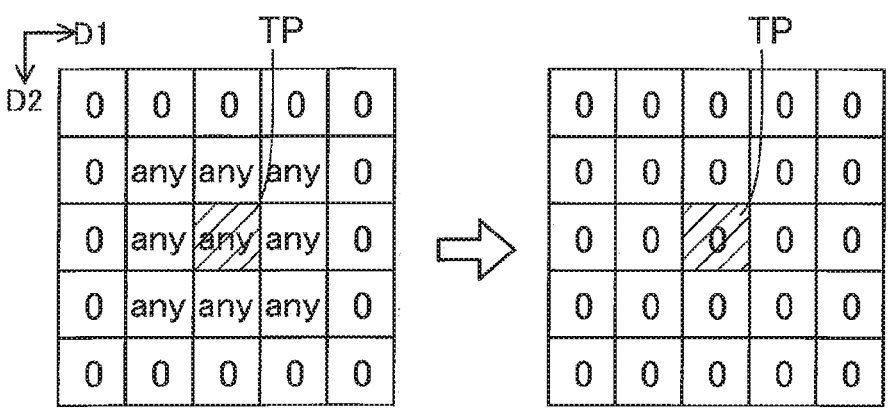

FIGS. 9A to 9D are explanatory views for explaining the isolated pixel removal processing. FIGS. 9A to 9C each illustrates nine pixel values of three-by-three pixels arranged in a matrix form in which the pixels are arranged in rows (first direction D1) and columns (second direction D2) with a target pixel TP as the center, and FIG. 9D illustrates twenty-five pixel values of five-by-five pixels arranged in a matrix form in which the pixels are arranged in rows (first direction D1) and columns (second direction D2) with a target pixel TP as the center. The CPU 210 designates the target pixel TP one by one from a plurality of pixels in the binary image represented by the binary image data, and determines whether or not the pixel values within a predetermined range centered on the target pixel TP have a specific pattern illustrated on the left side in each of FIGS. 9A to 9D. In each of FIGS. 9A to 9D, a pixel having a pixel value of "1" indicates the edge pixel, a pixel having a pixel value of "0" indicates the non-edge pixel, and a pixel having a pixel value of "any" indicates either the edge pixel or the non-edge pixel.

The pattern illustrated on the left side of FIG. 9A is a pattern in which the target pixel TP is the non-edge pixel and two pixels adjacent to the top and bottom of the target pixels TP are the edge pixels. The pattern illustrated on the left side of FIG. 9B is a pattern in which the target pixel TP is the non-edge pixel and two pixels adjacent to the left and right of the target pixels TP are the edge pixels. When the pixel values within a predetermined range have the pattern illustrated on the left side of FIG. 9A or FIG. 9B, the CPU 210 changes the target pixel TP from the non-edge pixel to the edge pixel as illustrated on the right side of FIG. 9A or FIG. 9B.

The pattern illustrated on the left side of FIG. 9C is a pattern in which the target pixel TP is the edge pixel and four pixels adjacent to the left, right, top, and bottom of the target pixels TP are the non-edge pixels. When the pixel values within a predetermined range have the pattern illustrated on the left side of FIG. 9C, the CPU 210 changes the target pixel TP from the edge pixel to the non-edge pixel as illustrated on the right side of FIG. 9C.

The pattern illustrated on the left side of FIG. 9D is a pattern in which sixteen pixels adjacent to the outside of the range of nine pixels of three-by-three pixels are all the non-edge pixels. The nine pixels of three-by-three pixels are arranged in a matrix form in which the pixels are arranged in rows (first direction D1) and columns (second direction D2) with the target pixel as the center, and the sixteen pixels surrounds the nine pixels. When the pixel values within a predetermined range have the pattern illustrated on the left side of FIG. 9D, the CPU 210 sets all the nine pixels of three-by-three pixels centered on the target pixel TP to the non-edge pixels as illustrated on the right side of FIG. 9D.

The binary image data that has been subjected to the isolated pixel removal processing (i.e., removed binary image data) generated in S160 is final first binary image data generated in the first binary image data generation processing.

As described above, the smoothing processing is applied to each of the plurality of sets of component image data, and the plurality of sets of smoothed component image data are generated (S100 of FIG. 4). The edge enhancement processing is applied to each of the plurality of sets of smoothed component image data, and the plurality of sets of edge-enhanced component image data is generated (S110 of FIG. 4). The luminance image data which is single-component image data constituted of one type of component value is generated using the plurality of sets of edge-enhanced component image data (S120). Then, a plurality of edge pixels constituting the edges in the scan image SI is specified using the generated luminance image data (S130 to S160 of FIG. 4 and S26 of FIG. 2). As a result, application of the smoothing processing to each of the plurality of sets of component image data allows the appearance of features of halftone dots in the scan image SI to be reduced, as described with reference to FIGS. 7A and 7B. Further, application of the edge enhancement processing to each of the plurality of sets of smoothed component image data allows the edges in the scan image SI that has been smoothed by applying the smoothing processing thereto to be appropriately enhances, as described with reference to FIGS. 7B and 7C. As a result, edge pixels in the scan image SI can be appropriately specified while suppressing the specification of edge pixels caused by the halftone dots.

Further, since the luminance image data is used as the single-component image data, the plurality of edge pixels in the image SI can be specified more appropriately. For example, the halftone dots each often has a primary color of any of C, M, and Y used for printing, and differences among the plurality of primary colors are comparatively large in each of the R, G, and B component image data but are comparatively small in the luminance image data. Thus, usage of the luminance image data allows the specification of edge pixels caused by the halftone dots to be appropriately suppressed. Further, for good legibility, a comparatively large difference in luminance is often given between the color of characters and color of background. Thus, usage of the luminance image data allows the edge pixels constituting the edges of objects including a character to be appropriately specified.

In addition, so-called unsharp mask processing including calculation of the mask value MV (referred to also as "smoothed value") corresponding to the target pixel (S210 of FIG. 6); calculation of the difference $\Delta V$ between the target pixel value TV and the mask value MV corresponding to the target pixel (S220 of FIG. 6); and calculation of the sum (TV+$\Delta V$) of the target pixel value TV and the difference $\Delta V$ corresponding to the target pixel (S240 of FIG. 6) is performed in the edge enhancement processing of FIG. 6. This allows the edges in the scan image SI to be appropriately enhanced, so that omission in specification of the edge pixels to be specified can be suppressed. As a result, the edge pixels in the scan image SI can be specified more appropriately.

Further, in the edge enhancement processing of FIG. 6, among the plurality of pixels in the scan image SI, for each of the pixels whose absolute value of corresponding difference $\Delta V$ is equal to or larger than the reference, the above-described sum (TV+$\Delta V$) is calculated as the processed value; whereas for each of the pixels whose absolute value of corresponding difference $\Delta V$ is smaller than the reference, the above-described sum (TV+$\Delta V$) is not calculated (S230 and S240 of FIG. 6). Then, for each of the pixels whose absolute value of corresponding difference $\Delta V$ is equal to or larger than the reference, the above-described sum (TV+$\Delta V$) is recorded as the corresponding pixel value in the edge-enhanced component image data; whereas for each of the pixels whose absolute value of corresponding difference $\Delta V$ is smaller than the reference, the original pixel value (pixel value in the smoothed component image data) is recorded as the corresponding pixel value (S245 of FIG. 6).

In other words, assuming that M is an integer equal to or greater than two and N1 is an integer equal to or greater than zero and less than M, the CPU 210 calculates, among M number of pixel values in the smoothed component image data, N1 number of processed values (sum (TV+$\Delta V$)) respectively corresponding to N1 number of pixel values whose absolute value of corresponding differences $\Delta V$ are equal to or greater than the reference (S245 of FIG. 6). Then, assuming that N2 is an integer satisfying the relation N1+N2=M, the CPU 210 generates the edge-enhanced component image data including the N1 number of processed values respectively corresponding to the N1 number of pixel values and the N2 number of pixel values whose absolute value of corresponding difference $\Delta V$ are smaller than the reference among the M number of pixel values of the smoothed component image data. As a result, as described with reference to FIGS. 7B and 7C, the differences among the pixel values caused by the halftone dots in the scan image SI can be further suppressed from being enhanced. Therefore, the specification of edge pixels caused by the halftone dots can be further suppressed. Further, the edges of objects such as a character and the like can be adequately enhanced. Thus, the edge pixels in the scan image SI can be specified more appropriately.

In addition, in the above-described first binary image data generation processing of FIG. 4, the level modification processing is applied to the edge strength data, and the modified edge strength data is generated (S140 of FIG. 4). Then, edge pixel specifying processing including the binarization processing to binarize the modified edge strength data (S150 and S160 of FIG. 4). As described above, the binarization processing is executed after the range between the binarization thresholds (range greater than the threshold Va and smaller than the threshold Vb of FIG. 8) is extended, so that accuracy of binarization can be improved. Thus, the accuracy of specifying the edge pixels in the scan image SI can be improved.

Further, after execution of the binarization processing to binarize the edge strength data (S150), in S160 the isolated pixel removal processing including the processing to remove the isolated pixels (FIGS. 9C and 9D) is applied to the binary data. In other words, in S150 a plurality of candidate pixels which are candidates of a plurality of edge pixels are specified. Then, in S160 the final edge pixels are specified by removing isolated candidate pixels from the plurality of candidate pixels. The edge pixels due to the halftone dots are highly likely to be isolated unlike the edges of a character and the like, for example. Thus, even if the edge pixels due to the halftone dots are specified in the binary image data generated in S150, they can be appropriately removed by the isolated pixel removal processing. As a result, the edge pixels in the scan image SI can be specified more appropriately.

Further, in the embodiment described above, the isolated pixel removal processing includes the processing to remove isolated non-edge pixels (FIGS. 9A and 9B), in addition to the processing to remove the isolated edge pixels. Thus, the edge of a character and the like can be suppressed from discontinuing due to existence of the non-edge pixel in a portion constituting the edge of the character and the like.

A-5: Second Binary Image Data Generation Processing

Figure 10:
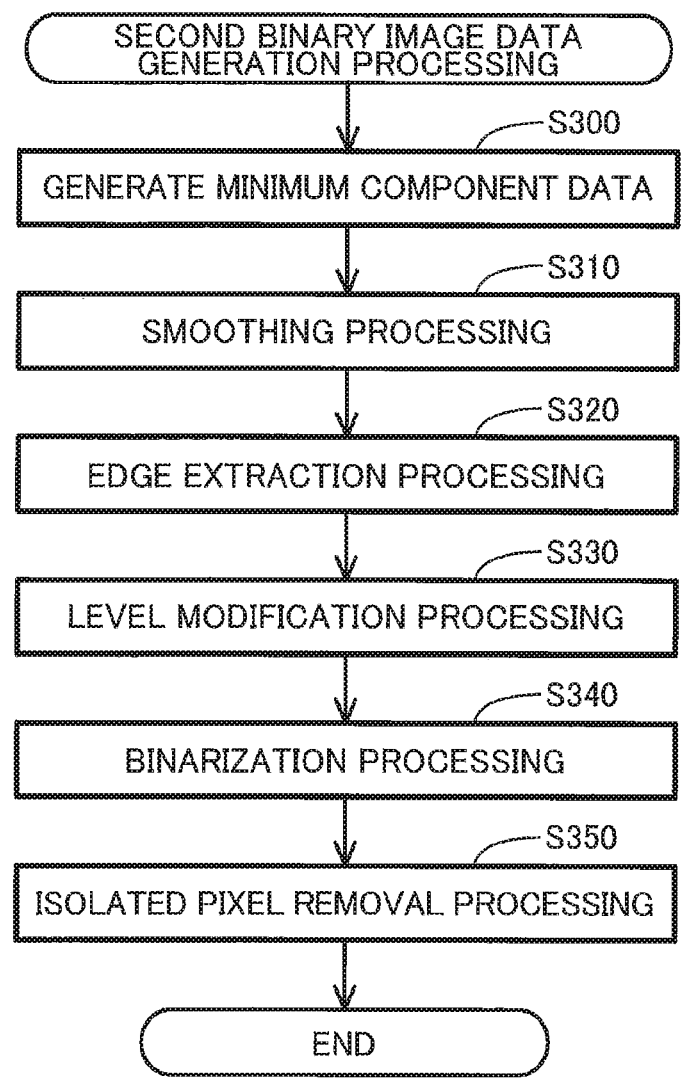
FIG. 10 is a flowchart illustrating steps in second binary image data generation processing executed by the multifunction peripheral according to the embodiment.
Figure 11A:
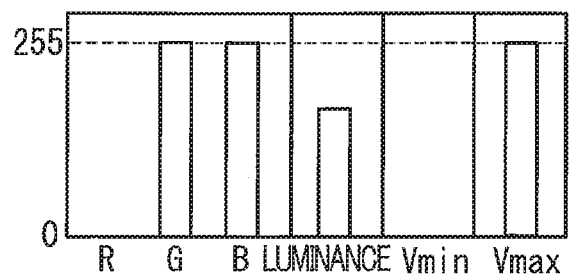
FIG. 11A is an explanatory view illustrating RGB values, a luminance, a minimum component value, and a maximum component value of cyan in the scan data by bar graphs.
Figure 11D:
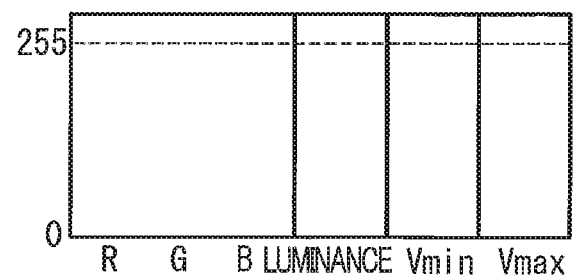
FIG. 11D is an explanatory view illustrating RGB values, a luminance, a minimum component value, and a maximum component value of black in the scan data by bar graphs.
Figure 11B:
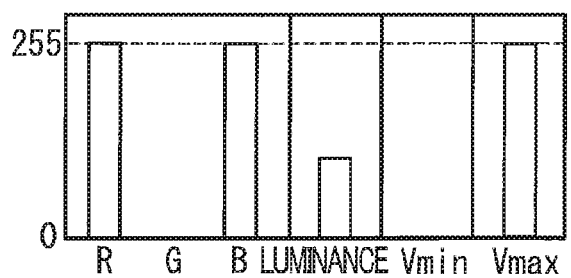
FIG. 11B is an explanatory view illustrating RGB values, a luminance, a minimum component value, and a maximum component value of magenta in the scan data by bar graphs.
Figure 11E:
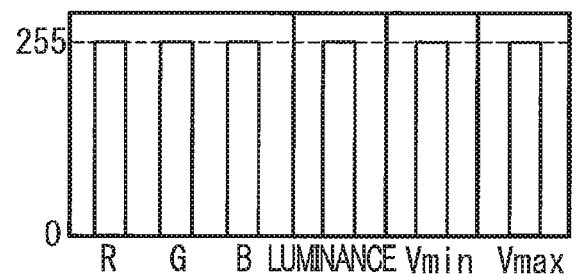
FIG. 11E is an explanatory view illustrating RGB values, a luminance, a minimum component value, and a maximum component value of white in the scan data by bar graphs.
Figure 11C:
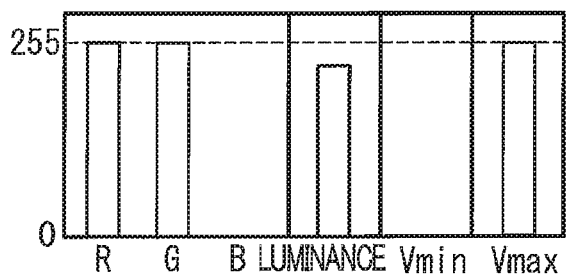
FIG. 11C is an explanatory view illustrating RGB values, a luminance, a minimum component value, and a maximum component value of yellow in the scan data by bar graphs.

The second binary image data generation processing executed in S24 of FIG. 2 will be described. FIG. 10 is a flowchart illustrating steps in the second binary image data generation processing. In S300, the CPU 210 generates minimum component data using the scan data. Specifically, the CPU 210 acquires a minimum component value Vmin from each of the plurality of pixel values (RGB value) included in the scan data. That is, the CPU 210 acquires a plurality of minimum component values Vmin corresponding to respective ones of the plurality of pixels included in the scan image SI. Each minimum component value Vmin is the minimum value among a plurality of component values (R value, G value, and B value) of the corresponding pixel. The CPU 210 generates, as the minimum component data, image data including a plurality of minimum component values Vmin as the plurality of pixel values. The minimum component data is image data representing an image having the same size as that of the scan image SI. Each of the plurality of pixel values included in the minimum component data is the minimum component value Vmin among the component values of the corresponding pixel value (RGB value) included in the scan data.

FIGS. 11A to 11E are explanatory views of minimum and maximum component values in the scan data. FIGS. 11A to 11E illustrate the RGB values of respective cyan (C), magenta (M), yellow (Y), black (K), and white (W) by bar graphs. As illustrated in FIGS. 11A to 11E, the RGB values (denoted by R, G, and B in FIGS. 11A to 11E) of the respective C, M, Y, K, and W are (0, 255, 255), (255, 0, 255), (255, 255, 0), (0, 0, 0), and (255, 255, 255).

As described above, the luminance Y of each of the RGB values of respective C, M, Y, K, and W can be calculated using the following expression: $Y=0.299 \times R+0.587 \times G+0.114 \times B$, for example. The luminances Y (represented by values ranging from 0 to 255) of the respective C, M, Y, K, and W are 186, 113, 226, 0, 255, approximately, which are mutually different values (FIGS. 11A to 11E). On the other hand, the minimum component values Vmin of the respective C, M, Y, K, and W are 0, 0, 0, 0, and 255 as illustrated in FIGS. 11A to 11E. That is, the minimum component values Vmin are the same value except for that of white (W).

Figure 12A:
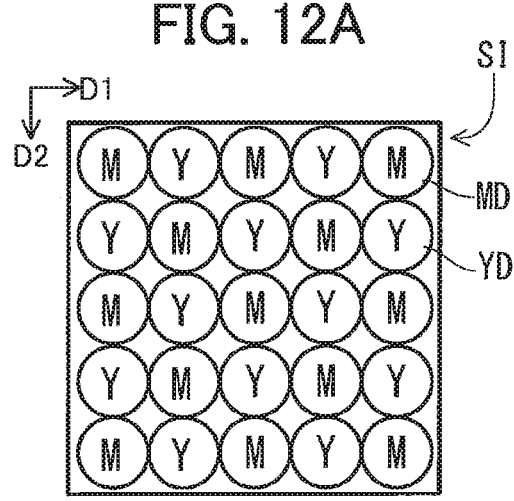
Figure 12B:
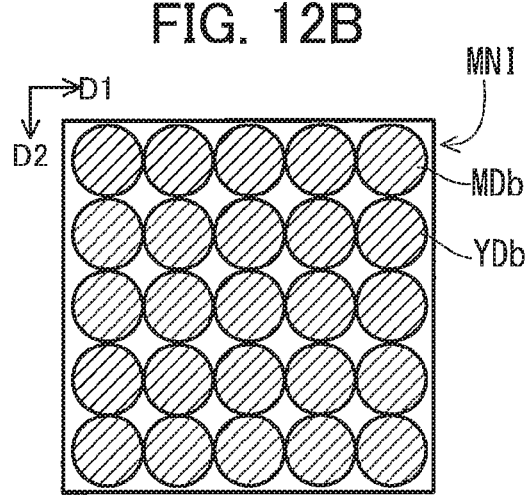
Figure 12C:
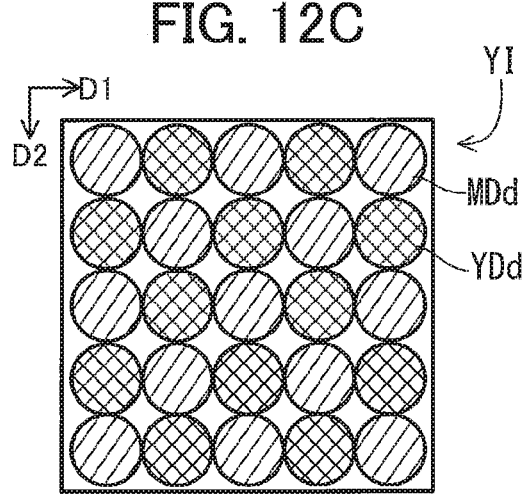

FIGS. 12A to 12C are second views each illustrating an example of an image used in the image processing. FIG. 12A is an enlarged view of the above-described halftone dots area which is extracted from the scan image SI. In the example of FIG. 12A, for example, the halftone dots area in the scan image SI includes a plurality of M dots MD and a plurality of Y dots YD. Here, for the purpose of illustration, it is assumed that an image representing the M dot MD is a uniform image having the primary color of magenta and that an image representing the Y dot YD is a uniform image having the primary color of yellow.

FIG. 12B illustrates an example of a minimum component image MNI represented by the minimum component data. The minimum component image MNI corresponds to the scan image SI of FIG. 6A. In the minimum component image MNI, the pixel value in an area MDb corresponding to the M dot MD in the scan image SI and the pixel value in an area YDb corresponding to the Y dot YD are the same as each other. FIG. 12C illustrates, as a comparative example, a luminance image YI represented by luminance image data indicative of the luminance of each of the pixels. The luminance image YI corresponds to the scan image SI of FIG. 12A. Unlike in the case of the minimum component image MNI of FIG. 12B, in the luminance image YI, the pixel value in an area MDb corresponding to the M dot MD in the scan image SI and the pixel value in an area YDb corresponding to the Y dot YD differ from each other.

As can be seen from the above description, differences among the plurality of pixel values in an area corresponding to a portion of the scan image SI where any of C, M, Y, and K dots are formed in the original are smaller in the minimum component image MNI than those in the luminance image YI. Further, in the minimum component image MNI, the pixel values in the base color area corresponding to a portion of the scan image SI that represents the base color (white color of the paper sheet) in the original are larger than the pixel values in an area corresponding to a portion of the scan image SI where dots are formed in the original.

In S310, the CPU 210 applies smoothing processing to the generated minimum component data. The smoothing processing is processing to smooth the minimum component image MNI represented by the minimum component data. The CPU 210 thereby generates smoothed minimum component data. Specifically, the CPU 210 applies a prescribed smoothing filter (in the present embodiment, the Gaussian filter GFb illustrated in FIG. 5B) to the pixel values constituting the minimum component data to thereby calculate the smoothed pixel values. The Gaussian filter GFb specifies coefficients corresponding to respective ones of twenty-five pixels of five-by-five pixels arranged in a matrix form in which the pixels are arranged in rows (horizontal direction) and columns (vertical direction). As described above, the horizontal direction and vertical direction correspond to the first direction D1 and second direction D2 illustrated in FIGS. 3A to 3D, respectively. In other words, the Gaussian filter GFb specifies one coefficient corresponding to a target pixel TP and twenty-four coefficients respectively corresponding to twenty-four peripheral pixels including four pixels adjacent to the left, right, top, and bottom of the target pixel TP. For example, in the Gaussian filter GFb, the coefficient corresponding to the target pixel TP is specified as (36/P), where the denominator P is 256. The CPU 210 multiplies the respective pixel values of twenty-five pixels within the filter range including the target pixel TP and its peripheral pixels by their corresponding coefficients specified in the Gaussian filter GFb to thereby calculate twenty-five modified values. Then, the CPU 210 calculates the sum of the twenty-five modified values as the smoothed pixel values of the target pixel TP.

In S320, the CPU 210 applies edge extraction processing to the smoothed minimum component data. The edge extraction processing is processing to extract edges in the smoothed minimum component image MNI represented by the smoothed minimum component data. The CPU 210 thereby generates edge strength data. Specifically, the CPU 210 applies the same Sobel filter as that used in S130 of FIG. 4 to the pixel values constituting the smoothed minimum component data to thereby calculate a plurality of edge strengths Se. The CPU 210 generates the edge strength data in which the plurality of pixel values is respectively represented by the plurality of edge strengths Se.

In S330, the CPU 210 applies level modification processing to the edge strength data to thereby generate modified edge strength data. The level modification processing is the same processing as that executed in S140 of FIG. 4, and is modification processing to extend a specific range within the range of the gradation values that the pixel values constituting the edge strength data can take (in the present embodiment, values ranging from 0 to 255).

In S340, the CPU 210 applies the same processing as the binarization processing executed in S150 of FIG. 4 to the modified edge strength data to thereby generate binary image data. For example, in the modified edge strength data, the CPU 210 classifies pixels having a pixel value (i.e., edge strength) equal to or greater than a threshold (for example, 128) into edge pixels, and classifies pixels having a pixel value smaller than the threshold into non-edge pixels. As described above, in the binary image data, the edge pixel value and non-edge pixel value are "1" and "0", respectively.

In S350, the CPU 210 applies isolated pixel removal processing to the binary image data. The isolated pixel removal processing is processing to remove isolated edge pixels and isolated non-edge pixels from the binary image data. The CPU 210 thereby generates binary image data that has been subjected to the isolated pixel removal processing, i.e., removed binary image data. The isolated pixel removal processing is the same processing as that executed in S160 of FIG. 4.

The removed binary image data generated in S350 is final second binary image data generated in the second binary image data generation processing.

As described above, the minimum component data including a plurality of corresponding values respectively corresponding to the plurality of pixel values included in the scan data is generated (S300 of FIG. 10), and the edge strength data is generated by applying the edge extraction processing to the minimum component data (S320 of FIG. 10). Here, each of the plurality of corresponding values included in the minimum component data is the minimum component value Vmin. Then, the plurality of edge pixels in the scan image SI is specified (S330 to S350 of FIG. 10 and S26 of FIG. 2) by executing the edge pixel specifying processing including processing to binarize the edge strength data (S340 of FIG. 10). In the minimum component data, differences among the pixel values can be reduced in the halftone dots area, as described with reference to FIGS. 12A to 12C. As a result, the specification of edge pixels caused by the halftone dots can be suppressed when specifying edge pixels. Thus, edge pixels in the scan image SI can be appropriately specified.

More specifically, five types of elements, C, M, Y, and K dots and base color (white) of the paper sheet, constitute the halftone dots area. In the minimum component data, out of these five types of elements, differences among the pixel values representing four types of elements can be reduced. As a result, when the minimum component data is used, specification of edge pixels representing edges of the halftone dots can be suppressed.

It is often the case that when a character exists in an image, the character has a dark color and its background has a light color, or vice versa. Accordingly, one of the color and background may include a relatively large amount of portions representing the base color (white) of the paper sheet, and the other one thereof may include a relatively large amount of portions representing any of C, M, Y, and K dots. As illustrated in FIGS. 11A to 11E, in the minimum component data, large differences exist between the pixel values in a portion representing any of C, M, Y, and K dots and the pixel values in a portion representing the base color (white) of the paper sheet. Thus, it is more likely that when edge pixels are specified using the minimum component data, the edge pixels constituting the edges of characters can be appropriately specified. Particularly, yellow (Y) is lower in density (higher in luminance) than cyan (C), magenta (M), and black (K). Thus, if the luminance image data is binarized in a case where a character having a yellow color exists on a background having the base color (white) of the paper sheet, the edge pixels constituting the edges of the yellow character may not be appropriately specified. In the present embodiment, even in such a case, the edge pixels constituting the yellow character can be appropriately specified. Thus, by specifying the edge pixels using not only the luminance data but also the minimum component data, edge pixels of a character and the like that cannot be specified using only the luminance image data can be specified. As a result, the accuracy of specifying the edge pixels in the scan image SI can be improved.

Further, the smoothed minimum component data is generated by applying the smoothing processing to the minimum component data, and the edge extraction processing is applied to the smoothed minimum component data (S320 of FIG. 10). As a result, differences among the pixel values in the halftone dots area of the minimum component image MNI can be further suppressed by executing the smoothing processing. For example, in the halftone dots area of the scan image SI, a portion representing the dot does not always have the primary color of C, M, Y, or K due to overlap of the dots of C, M, Y, and K, blurring at the time of reading by the reading execution unit 290, or the like. Therefore, in the minimum component image MNI, differences among a plurality of pixel values representing C, M, Y, and K dots are small but not zero. Application of the smoothing processing allows the above-described differences among the pixel values to be further reduced. As a result, the specification of edge pixels caused by the halftone dots can be further suppressed.

Further, as in the first binary image data generation processing, the level modification processing is executed in the second binary image data generation processing (S330 of FIG. 10). Thus, the accuracy of specifying the edge pixels in the scan image SI can be improved as in the first binary image data generation processing. Further, as in the first binary image data generation processing, the isolated pixel removal processing is executed in the second binary image data generation processing (S350). Thus, as in the first binary image data generation processing, the edge pixels in the scan image SI can be specified more appropriately.

As described above, in the embodiment described above, two sets of single-component image data, i.e., the luminance image data and minimum component data are used to finally specify the edge pixels (S22 to S26 of FIG. 2). Since the two sets of single-component image data generated by mutually different processing are used to specify the plurality of edge pixels in the scan image SI, omission in specification of the edge pixels in the scan image SI can be suppressed. This is because edge pixels that can be specified by using each of a plurality of sets of single-component image data may differ according to, for example, the color of a portion constituting an edge.

Specifically, when a yellow character exists on a white background, it is difficult to specify the edge pixels constituting the edge of the character by using the luminance image data since a difference in luminance between the white and yellow is relatively small. On the other hand, as can be seen from FIGS. 11C and 11E, a difference between the white and yellow is large in the minimum component data. Thus, the edge pixels constituting the edge of the yellow character on the white background can be easily specified by using the minimum component data. Further, for example, when a yellow character exists on a magenta background, it is difficult to specify the edge pixels constituting the edge of the character by using the minimum component data since a difference does not appear between the magenta and yellow in the minimum component data. On the other hand, a difference in luminance between the magenta and yellow is relatively large. Thus, the edge pixels constituting the edge of the yellow character on the magenta background can be easily specified by using the luminance image data.

Further, in addition to the luminance image data, the minimum component data is used as the single-component image data. Accordingly, the specification of edge pixels caused by the halftone dots in the scan image SI can be suppressed, as described above.

B. Modifications (1) In the image processing of FIG. 2 in the embodiment described above, the second binary image data generation processing of S24 and the combining processing of S26 may be omitted. That is, the plurality of pixels specified in the first binary data generation processing may be the final classification data.

(2) The single-component image data used in the first binary image data generation processing of FIG. 4 is the luminance image data in the embodiment described above. Alternatively, average component value image data may be used. Here, the average component value image data includes, as each pixel value, the average value of the three component values (R value, G value, and B value) included in the RGB value of the corresponding pixel in the scan data. Generally, each of the plurality of pixel values included in the single-component image data used in the first binary image data generation processing is preferably generated by using three component values included in the RGB value of the corresponding pixel in the scan data.

(3) Although the minimum component data is used (S300) in the second binary image data generation processing of FIG. 10 in the embodiment described above, maximum component data or inverted minimum component data to be described below may be used.

The maximum component data includes a plurality of values corresponding to respective ones of the plurality of pixels included in the scan data, and each of the plurality of values is a maximum component value Vmax of the corresponding pixel in the scan data. The maximum component value Vmax is the maximum value among the plurality of component values (R value, G value, and B value) included in the RGB value of the corresponding pixel in the scan data.

The inverted minimum component data is acquired as follows. First, a plurality of inverted color values are generated for respective ones of the plurality of pixel values (RGB values) included in the scan data. Specifically, each of the inverted color values is generated by inverting the component values (R value, G value, and B value) included in the corresponding pixel value (RGB value). Assuming that an RGB value before inversion is represented by (Rin, Gin, Bin), an inverted RGB value (Rout, Gout, Bout) is expressed by the following expressions (2) to (4):

$$Rout=Rmax-Rin \quad (2)$$

$$Gout=Gmax-Gin \quad (3)$$

$$Bout=Bmax-Bin \quad (4)$$

The Rmax, Gmax, and Bmax in the above expressions are the maximum values that the respective R value, G value, and B value can take. In the present embodiment, Rmax, Gmax, and Bmax are all 255. Image data which includes, as a plurality of pixel values, the plurality of inverted RGB values corresponding to respective ones of the plurality of pixels is generated as the inverted image data. Then, the inverted minimum component data is generated using the inverted image data. Specifically, inverted minimum component values VRmin are acquired from respective ones of the plurality of inverted RGB values included in the inverted image data. Each of the inverted minimum component values VRmin is the minimum value among the plurality of component values (R value, G value, and B value) included in the corresponding inverted RGB value. The inverted minimum component data is image data which includes the plurality of inverted minimum component values VRmin as a plurality of pixel values.

Each of the inverted minimum component values VRmin is the inverted value of the corresponding maximum component value, and the relationship VRmin=(255−Vmax) is satisfied. Thus, it can be said that both the maximum component data and inverted minimum component data are image data which includes a plurality of values (the inverted value of the maximum value or the maximum value itself), as respective ones of the plurality of pixel values, each of which is obtained on the basis of the maximum value among the plurality of component values included in corresponding one of the plurality of pixel values constituting the scan data.

As illustrated in FIGS. 11A to 11E, the maximum component values Vmax of the respective C, M, Y, K, and W are 255, 255, 255, 0, and 255. That is, the maximum component values Vmax have the same value except for that of black (K). Thus, in the maximum component data or inverted minimum component data, out of five types of elements constituting the halftone dots area, i.e., the C, M, Y, and K dots and the base color (white) of the paper sheet, differences among the pixel values representing four types of elements of the C, M, and Y dots and the base color (white) of the paper sheet can be reduced. As a result, when the maximum component data or inverted minimum component data is used, the specification of edge pixels caused by the halftone dots can be suppressed as in the case where the minimum component data is used.

(4) In the second binary image data generation processing, single-component image data different from both the maximum component data and inverted minimum component data may be used in place of the minimum component data. For example, density image data may be used as the single-component image data. The density image data is obtained by converting the scan data which is the RGB image data into CMYK image data and then by converting a plurality of pixel values in the CMYK image data into respective ones of a plurality of values each representing the density of corresponding pixel. When the density image data is used, the smoothing processing and edge enhancement processing may be applied to each of four sets of component image data included in the CMYK image data before the density image data is generated in, for example, the second binary image data generation processing, as in the first binary image data generation processing.

(5) In the edge enhancement processing (S110) of the first binary image data generation processing illustrated in FIG. 4, so-called unsharp mask processing is executed. Alternatively, another edge enhancement processing, for example, sharpness processing for increasing the contrast of edges to clarify the outline of the object may be used.

(6) In the edge enhancement processing illustrated in FIG. 6, the processing of S230 may be omitted, and the processing of S240 may be applied to all the target pixels irrespective of the difference ΔV. Even in this case, if, for example, the halftone dots have been sufficiently smoothed in the smoothing processing of S100 in FIG. 4, edges of the halftone dots will not appear again in the edge enhancement processing.

Further, in the embodiment described above, one hundred pixel values within the rectangular range of ten-by-ten pixels arranged in a matrix form are used for calculating the mask value MV in S210 of FIG. 6. However, the present disclosure is not limited to this. Alternatively, for example, forty-nine pixel values within a rectangular range of seven-by-seven pixels arranged in a matrix form or one hundred twenty-one pixel values within a rectangular range of eleven-by-eleven pixels arranged in a matrix form may be used.

(7) In the embodiment described above, each of the plurality of pixel values constituting the scan data is represented by the RGB value, but may be represented by a color value of another color system. For example, each of the plurality of pixel values constituting the scan data may be represented by a color value of a CMY color system including three component values of C, M, and Y.

(8) In the embodiment described above, the edge sharpening processing is applied to the edge pixel values (S40 of FIG. 2), and the halftone dots smoothing processing is applied to the non-edge pixel values (S30 of FIG. 2). Alternatively, anti-alias processing for improving appearance of characters may be applied to the edge pixel values. Further, the processing of washing out color (processing of converting the pixel color into white) may be applied to the non-edge pixel values for the purpose of reducing the amount of color materials for use in printing. In general, mutually different image processing is preferably applied to the edge pixel values and non-edge pixel values. Alternatively, specific image processing may be applied to only one of the edge pixel values and non-edge pixel values.

(9) In the embodiment described above, the Gaussian filter GFa having a filter range of seven-by-seven pixels arranged in a matrix form is used in the smoothing processing executed in S100 of FIG. 4. Alternatively, a Gaussian filter or a mean value filter having a filter range of five-by-five pixels arranged in a matrix form or three-by-three pixels arranged in a matrix form may be used. Thus, the number of peripheral pixels used in the smoothing processing can be appropriately changed depending on reading characteristics such as the resolution or blurring degree of the scan data. The same can be said for the smoothing processing in S310 of FIG. 10.

(10) In the embodiment described above, the Sobel filter is used in the edge extraction processing executed in S130 of FIG. 4 or S320 of FIG. 10. Alternatively, another edge extraction filter such as a Roberts filter of a Laplacian filter may be used in the edge extraction processing.

(11) In the embodiment described above, the scan data is used as the target image data, but the target image data is not limited to the scan data. Alternatively, the target image data may be generated by reading a printed matter with a digital camera provided with a two-dimensional image sensor.

(12) In the embodiment described above, the final classification data is generated by taking the logical sum of the first binary image data and second binary image data (S26 of FIG. 2). Alternatively, for example, the final classification data may be generated by taking the logical sum of the first binary image data and second binary image data to obtain the binary image data and by applying the isolated pixel removal processing to the obtained binary image data to generate the binary image data that has been subjected to the isolated pixel removal processing. In this case, the isolated pixel removal processing need not be executed in the generation processing of the first binary image data and second binary image data.

(13) In the embodiment described above, the final classification data is generated by taking the logical sum of the first binary image data and second binary image data (S26 of FIG. 2). Alternatively, the final classification data may be generated by taking the logical sum of the first binary image data, second binary image data, and third binary image data.

In this case, the third binary image data may be, for example, binary image data generated using the maximum component data described above. Thus, omission in specifying the edge of, for example, a character can be further reduced.

(14) In the embodiment described above, the first binary image data generation processing (FIG. 4) and second binary image data generation processing (FIG. 10) may be appropriately altered. For example, a part or all of the level modification processing in S140 of FIG. 4 and isolated pixel removal processing in S160 of FIG. 4 may be omitted. Further, a part or all of the smoothing processing in S310 of FIG. 10, level modification processing in S330 of FIG. 10, and isolated pixel removal processing in S350 of FIG. 10 may be omitted.

(15) The image processing apparatus realizing the image processing of FIG. 2 is not limited to the multifunction peripheral 200, but may be any one of various devices. For example, a scanner or a digital camera may execute the image processing of FIG. 2 by using target image data generated by itself so as to generate print date to be supplied to a printer. Further, for example, a terminal device (for example, the user terminal device 100) or a server (not illustrated) that can communicate with a scanner and a printer may execute the image processing of FIG. 2 by using scan data acquired from the scanner to generate print data to be supplied to the printer. Further, a plurality of computers (for example, cloud servers) communicable with one another through a network may execute the image processing as a whole while sharing the function required for the image processing among them. In this case, the whole of the plurality of computers is an example of the image processing apparatus.

(16) In the embodiment described above, some of the configurations implemented through hardware may be replaced by software, and conversely, some or all of the configurations implemented through software may be replaces by hardware. For example the smoothing processing executed in S100 of FIGS. 4 and 6 and the edge enhancement processing executed in S110 of FIG. 4 may be executed by dedicated hardware such as an ASIC.

While the description has been made in detail with reference to specific embodiment, the embodiment described above is an example for making the present disclosure easier to understand but does not limit the present disclosure. It would be apparent to those skilled in the art hat various changes and modifications may be made thereto.

What is claimed is:

1. An image processing apparatus comprising:
a processor; and
a memory storing a set of computer-readable instructions therein, the set of computer-readable instructions, when executed by the processor, causing the image processing apparatus to perform:
acquiring target image data representing a target image including a plurality of pixels, the target image data includes a plurality of component values corresponding to each of the plurality of pixels, the plurality of component values corresponding to respective ones of the plurality of components, the target image data being generated by scanning an original with an image sensor, the target image data including a plurality of sets of component image data representing respective ones of a plurality of component images, the plurality of sets of component image data corresponding to respective ones of a plurality of components constituting a specific color system;

generating first single-component image data using the plurality of sets of component image data, the first single-component image data including one type of component value generated from a first processing on the plurality of components constituting the specific color system corresponding to each of the plurality of pixels, the first processing comprising determining the first single-component image data from edge enhanced component image data of the target image data;

generating second single-component image data including another type of component value generated from a second processing on the plurality of components constituting the specific color system corresponding to each of the plurality of pixels, the second processing being different from the first processing, the second processing comprising acquiring, for each pixel among the target image data, a specific component value among the plurality of component values of the pixel, and setting the acquired specific component value as a pixel value of a corresponding pixel in the second single-component image data from the target image data; and specifying a plurality of edge pixels using the first single-component image data and the second single-component image data, the plurality of edge pixels constituting an edge in the target image.

2. The image processing apparatus according to claim 1, wherein the first single-component image data is luminance image data indicating a luminance of each of the plurality of pixels included in the target image.

3. The image processing apparatus according to claim 2, wherein the first single-component image data is one of first image data and second image data, the first image data including a plurality of first pixel values corresponding to respective ones of the plurality of pixels, each of the plurality of first pixel values being related to a minimum value among the plurality of component values of corresponding one of the plurality of pixels, the second image data including a plurality of second pixel values corresponding to respective ones of the plurality of pixels, each of the plurality of second pixel values being related to a maximum value among the plurality of component values of corresponding one of the plurality of pixels.

4. The image processing apparatus according to claim 1, wherein the specific component value being set as the second single-component image data is one of first image data and second image data, the first image data including a plurality of first pixel values corresponding to respective ones of the plurality of pixels, each of the plurality of first pixel values being related to a minimum value among the plurality of component values of corresponding one of the plurality of pixels, the second image data including a plurality of second pixel values corresponding to respective ones of the plurality of pixels, each of the plurality of second pixel values being related to a maximum value among the plurality of component values of corresponding one of the plurality of pixels.

5. The image processing apparatus according to claim 1, wherein specifying the plurality of edge pixels comprises:
specifying a plurality of first edge pixels using the first single-component image data, the first single-component image data representing a first image, the plurality of first edge pixels constituting an edge in the first image;

specifying a plurality of second edge pixels using the second single-component image data, the second single-component image data representing a second image, the plurality of second edge pixels constituting an edge in the second image; and specifying the plurality of edge pixels using the plurality of first edge pixels and the plurality of second edge pixels.

6. The image processing apparatus according to claim 5, wherein the specifying specifies a group of pixels included in at least one of the plurality of first edge pixels and the plurality of second edge pixels as the plurality of edge pixels, the plurality of edge pixels not including a pixel included in neither the plurality of first edge pixels nor the plurality of second edge pixels.

7. The image processing apparatus according to claim 5, wherein specifying the plurality of first edge pixels comprises:
specifying a plurality of first candidate pixels using the first single-component image data; and
removing an isolated first candidate pixel from the plurality of first candidate pixels to specify the plurality of first edge pixels, and
wherein specifying the plurality of second edge pixels comprises:
specifying a plurality of second candidate pixels using the first single-component image data; and
removing an isolated second candidate pixel from the plurality of second candidate pixels to specify the plurality of second edge pixels.

8. The image processing apparatus according to claim 1, wherein the target image includes the plurality of edge pixels and a plurality of non-edge pixels, the plurality of edge pixels having respective ones of a plurality of edge pixel values, the plurality of non-edge pixels having respective ones of a plurality of non-edge pixel values, and
wherein the set of computer-readable instructions, when executed by the processor, causes the image processing apparatus to further perform applying image processing to the target image data to generate processed target image data, the image processing including first image processing and second image processing different from the first image processing, the first image processing being applied to the plurality of edge pixel values, the second image processing being applied to the plurality of non-edge pixels.

9. The image processing apparatus according to claim 8, wherein the set of computer-readable instructions, when executed by the processor, causes the image processing apparatus to further perform generating print data using the processed target image data.

10. The image processing apparatus according to claim 1, wherein the specific color system is an RGB color system, and the plurality of components is a red component, a green component, and a blue component.

11. A non-transitory computer readable storage medium storing a set of program instructions installed on and executed by a computer, the set of program instructions comprising:
acquiring target image data representing a target image including a plurality of pixels, the target image data includes a plurality of component values corresponding to each of the plurality of pixels, the plurality of component values corresponding to respective ones of the plurality of components, the target image data being generated by scanning an original with an image sensor, the target image data including a plurality of sets of component image data representing respective ones of a plurality of component images, the plurality of sets of component image data corresponding to respective ones of a plurality of components constituting a specific color system;

generating first single-component image data using the plurality of sets of component image data, the first single-component image data including one type of component value generated from a first processing on the plurality of components constituting the specific color system corresponding to each of the plurality of pixels, the first processing comprising determining the first single-component image data from edge enhanced component image data of the target image data;

generating second single-component image data including another type of component value generated from a second processing on the plurality of components constituting the specific color system corresponding to each of the plurality of pixels, the second processing being different from the first processing, the second processing comprising acquiring, for each pixel among the target image data, a specific component value among the plurality of component values of the pixel, and setting the acquired specific component value as a pixel value of a corresponding pixel in the second single-component image data from the target image data; and specifying a plurality of edge pixels using the first single-component image data and the second single-component image data, the plurality of edge pixels constituting an edge in the target image.

12. The non-transitory computer readable storage medium according to claim 11, wherein the first single-component image data is luminance image data indicating a luminance of each of the plurality of pixels included in the target image.

13. The non-transitory computer readable storage medium according to claim 11, wherein the specific component value being set as the second single-component image data is one of first image data and second image data, the first image data including a plurality of first pixel values corresponding to respective ones of the plurality of pixels, each of the plurality of first pixel values being related to a minimum value among the plurality of component values of corresponding one of the plurality of pixels, the second image data including a plurality of second pixel values corresponding to respective ones of the plurality of pixels, each of the plurality of second pixel values being related to a maximum value among the plurality of component values of corresponding one of the plurality of pixels.

14. The non-transitory computer readable storage medium according to claim 11, wherein specifying the plurality of edge pixels comprises:

specifying a plurality of first edge pixels using the first single-component image data, the first single-component image data representing a first image, the plurality of first edge pixels constituting an edge in the first image;

specifying a plurality of second edge pixels using the second single-component image data, the second single-component image data representing a second image, the plurality of second edge pixels constituting an edge in the second image; and specifying the plurality of edge pixels using the plurality of first edge pixels and the plurality of second edge pixels.

15. The non-transitory computer readable storage medium according to claim 14, wherein the specifying of the plurality of edge pixels specifies a group of pixels included in at least one of the plurality of first edge pixels and the plurality of second edge pixels as the plurality of edge pixels, the plurality of edge pixels not including a pixel included in neither the plurality of first edge pixels nor the plurality of second edge pixels.

16. The non-transitory computer readable storage medium according to claim 14, wherein specifying the plurality of first edge pixels comprises:

specifying a plurality of first candidate pixels using the first single-component image data; and removing an isolated first candidate pixel from the plurality of first candidate pixels to specify the plurality of first edge pixels, and wherein specifying the plurality of second edge pixels comprises:

specifying a plurality of second candidate pixels using the first single-component image data; and removing an isolated second candidate pixel from the plurality of second candidate pixels to specify the plurality of second edge pixels.

17. The non-transitory computer readable storage medium according to claim 11, wherein the target image includes the plurality of edge pixels and a plurality of non-edge pixels, the plurality of edge pixels having respective ones of a plurality of edge pixel values, the plurality of non-edge pixels having respective ones of a plurality of non-edge pixel values, and wherein the set of computer-readable instructions further comprises applying image processing to the target image data to generate processed target image data, the image processing including first image processing and second image processing different from the first image processing, the first image processing being applied to the plurality of edge pixel values, the second image processing being applied to the plurality of non-edge pixels.

18. The non-transitory computer readable storage medium according to claim 17, wherein the set of computer-readable instructions further comprises generating print data using the processed target image data.

19. The non-transitory computer readable storage medium according to claim 11, wherein the specific color system is an RGB color system, and the plurality of components is a red component, a green component, and a blue component.

20. An image processing method comprising:

acquiring target image data representing a target image including a plurality of pixels, the target image data includes a plurality of component values corresponding to each of the plurality of pixels, the plurality of component values corresponding to respective ones of the plurality of components, the target image data being generated by scanning an original with an image sensor, the target image data including a plurality of sets of component image data representing respective ones of a plurality of component images, the plurality of sets of component image data corresponding to respective ones of a plurality of components constituting a specific color system;

generating first single-component image data using the plurality of sets of component image data, the first single-component image data including one type of component value generated from a first processing on the plurality of components constituting the specific color system corresponding to each of the plurality of pixels, the first processing comprising determining the first single-component image data from edge enhanced component image data of the target image data;

generating second single-component image data including one type of component value generated from a second processing on the plurality of components constituting the specific color system corresponding to each of the plurality of pixels, the second processing being different from the first processing, the second processing comprising acquiring, for each pixel among the target image data, a specific component value among the plurality of component values of the pixel, and setting the acquired specific component value as a pixel value of a corresponding pixel in the second single-component image data from the target image data; and specifying a plurality of edge pixels using the first single-component image data and the second single-component image data, the plurality of edge pixels constituting an edge in the target image.

* * * * *